United States Patent [19]
McQueen

[11] Patent Number: 5,355,727
[45] Date of Patent: Oct. 18, 1994

[54] METHOD OF MAKING AVERAGE MASS FLOW VELOCITY MEASUREMENTS

[75] Inventor: Malcolm M. McQueen, Fallbrook, Calif.

[73] Assignee: Fluid Components, Inc., San Marcos, Calif.

[21] Appl. No.: 932,233

[22] Filed: Aug. 19, 1992

Related U.S. Application Data

[62] Division of Ser. No. 543,337, Jun. 25, 1990, Pat. No. 5,167,153.

[51] Int. Cl.⁵ ............................................. G01F 1/68
[52] U.S. Cl. ............................................. 73/204.25
[58] Field of Search ........... 73/204.16, 204.25, 204.26, 73/204.27, 204.23; 338/25

[56] References Cited

U.S. PATENT DOCUMENTS

| | | | |
|---|---|---|---|
| 2,612,047 | 9/1952 | Nilsson et al. | 73/204.27 |
| 2,800,018 | 7/1957 | Phillips et al. | 73/204.25 |
| 3,246,515 | 4/1966 | Martino et al. | 73/204.27 |
| 3,683,692 | 8/1972 | Lafitte | 73/204.14 |
| 3,988,928 | 11/1976 | Edstrom et al. | 73/204.23 |
| 4,244,217 | 1/1981 | Ledbetter | 73/204.27 |
| 4,399,697 | 8/1983 | Kohama et al. | 73/204.16 |
| 4,502,339 | 3/1985 | Horn | 73/861.95 |
| 4,691,566 | 9/1987 | Aine | 73/204.26 |

*Primary Examiner*—Herbert Goldstein
*Attorney, Agent, or Firm*—Baker, Maxham, Jester & Meador

[57] ABSTRACT

A method for measuring average mass flow velocity in a duct employing an RTD (resistance temperature sensor or detector) sensing device which is a long, thin, unitary device adapted to be distributed across an extended field for the continuous, uninterrupted sensing or interrogation of such field. A very long, thin, ductile protective metal outer sheath houses a co-extensive body of insulation material, which in turn supports and electrically insulates one or more co-extensive RTD filaments and, in most forms of the invention, one or more heater filaments. The distributed RTD sensor may be configured in various ways to have continuous linear function sensitivity, continuous variable function sensitivity, or step function sensitivity. The distributed RTD sensor is used for measuring average mass flow velocity of fluids primarily in large ducts.

3 Claims, 8 Drawing Sheets

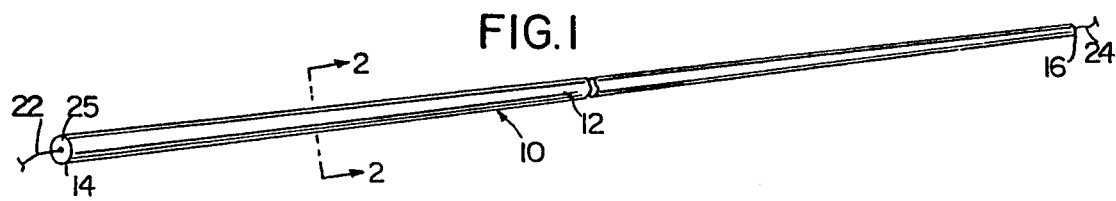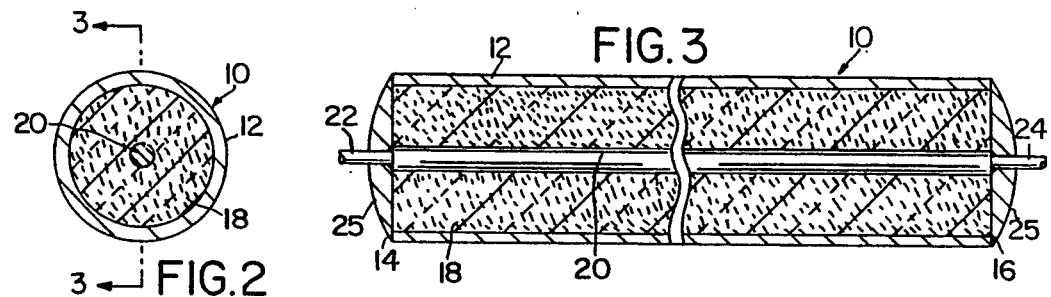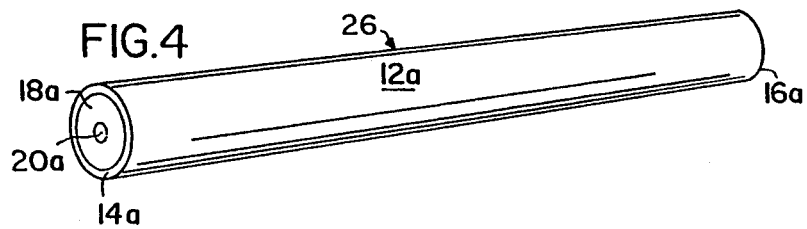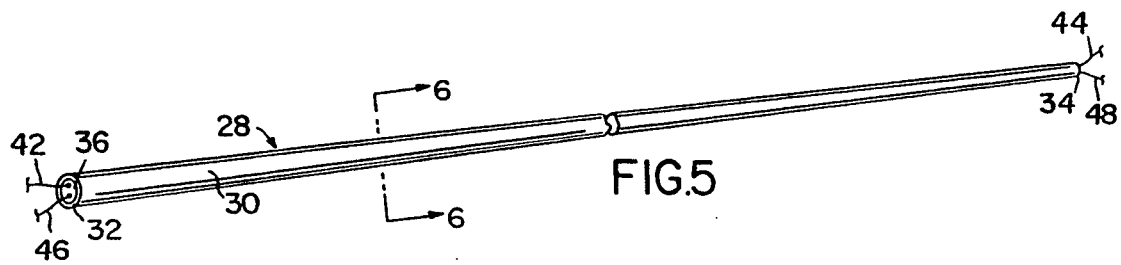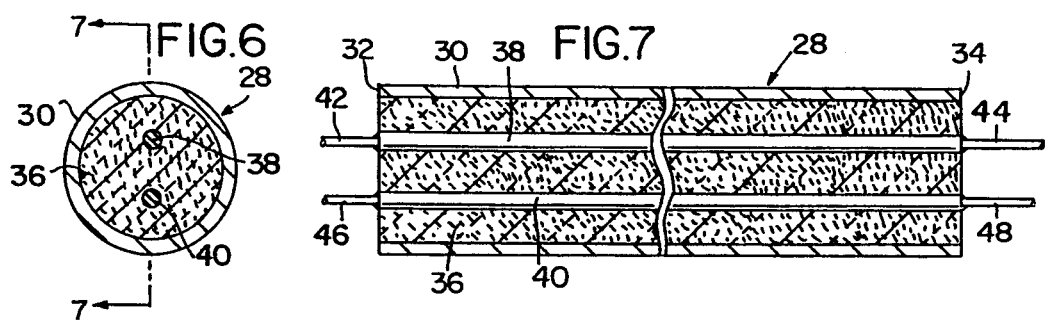

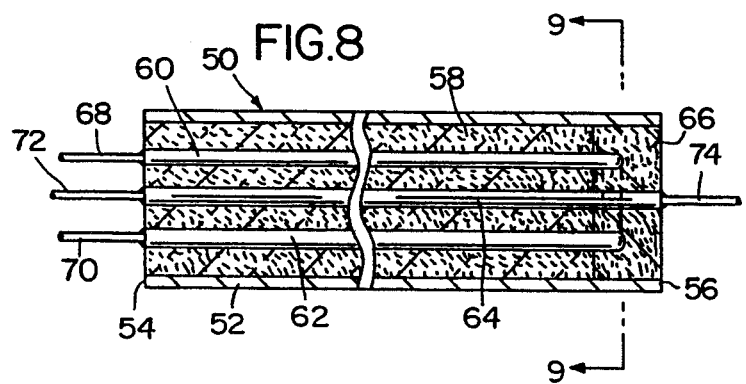
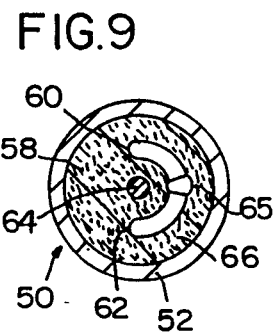
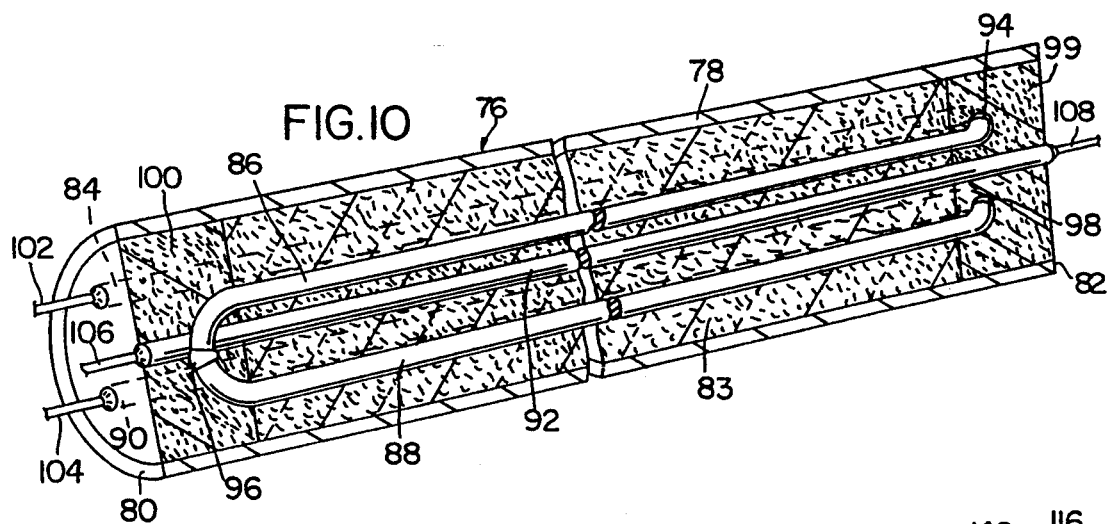
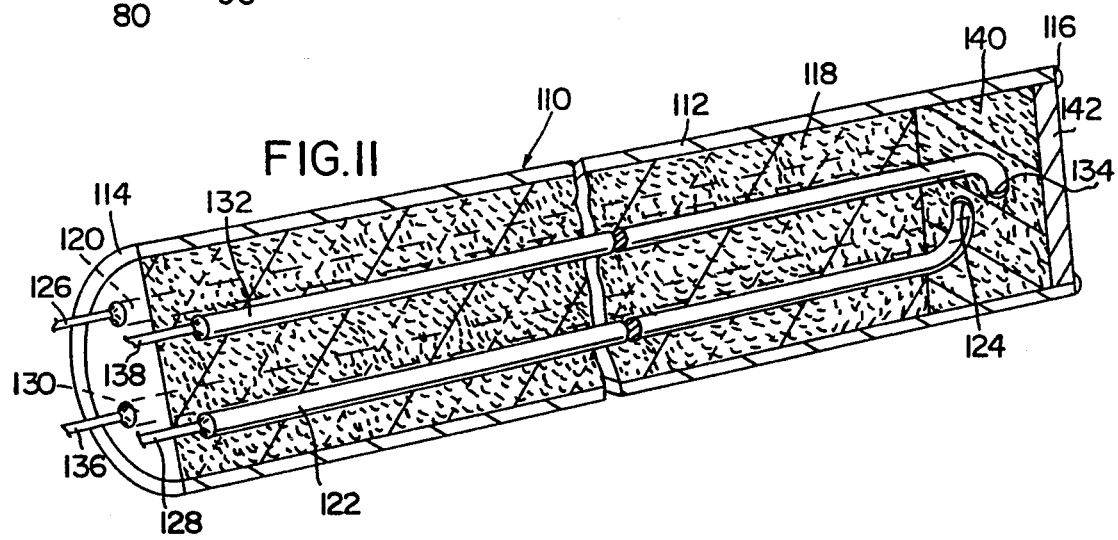

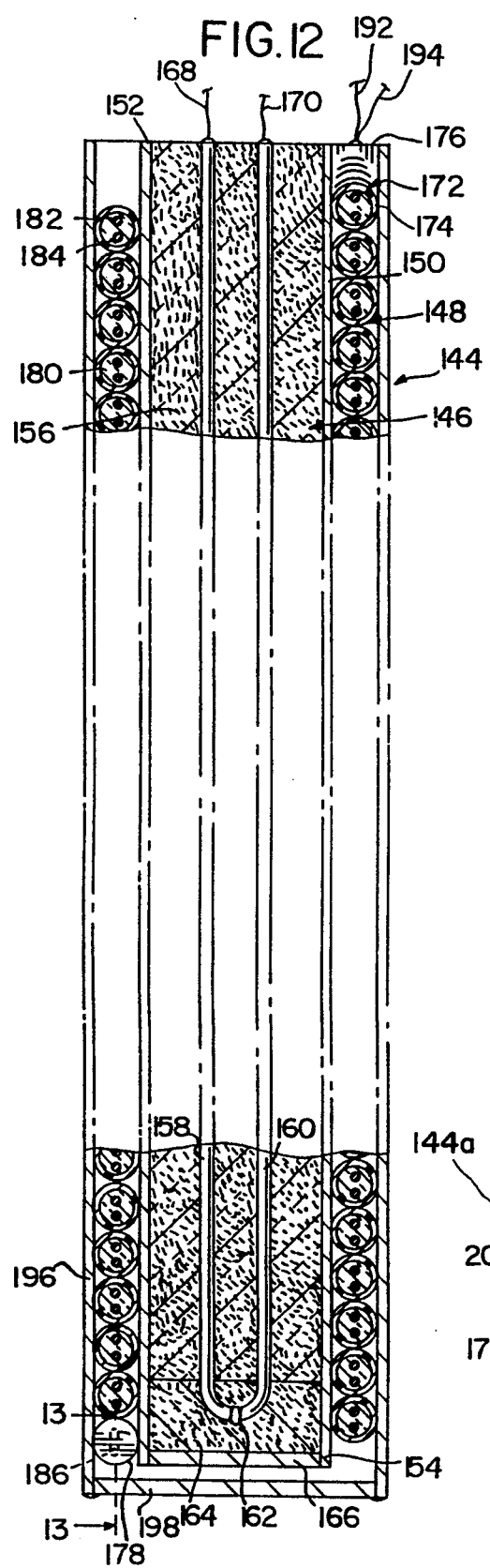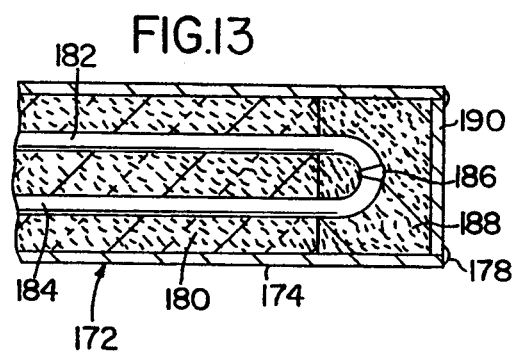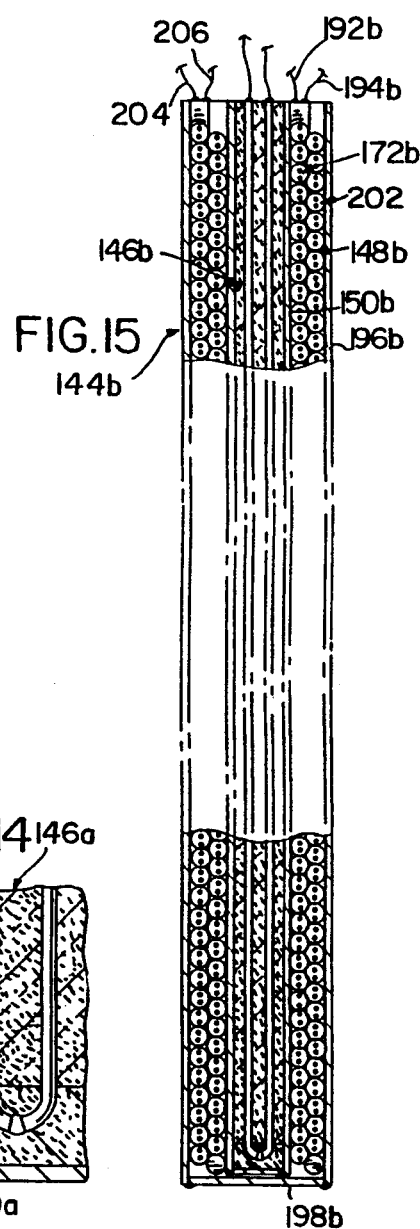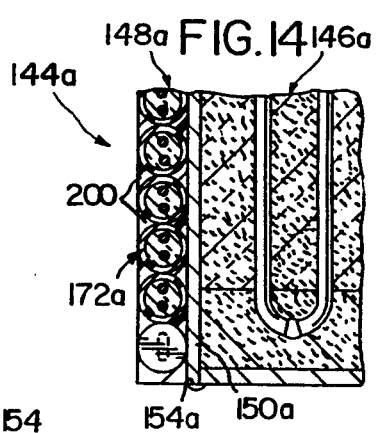

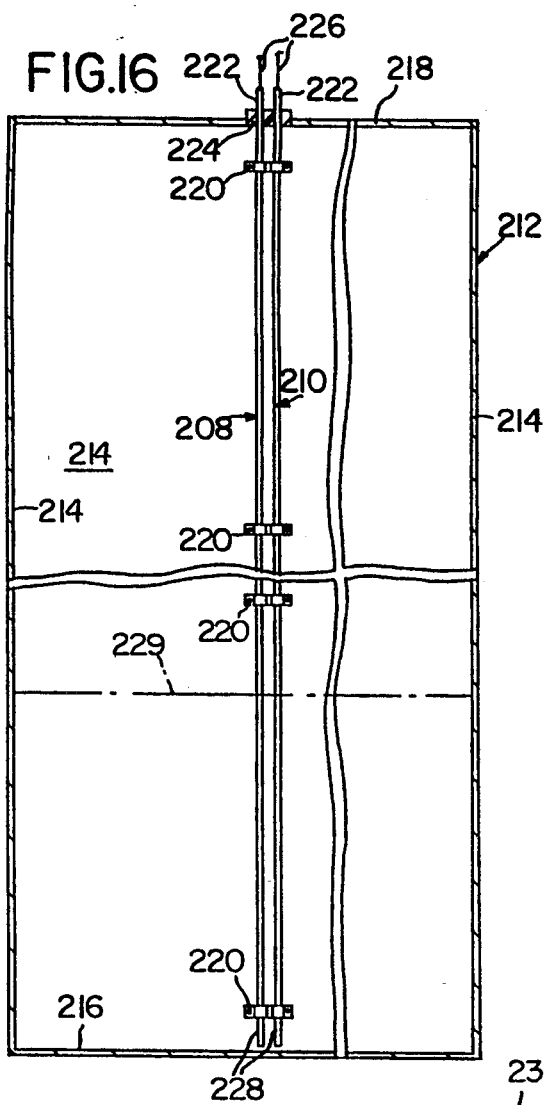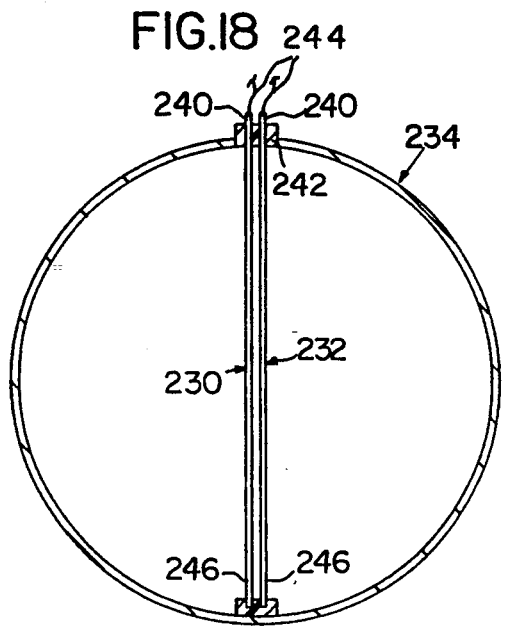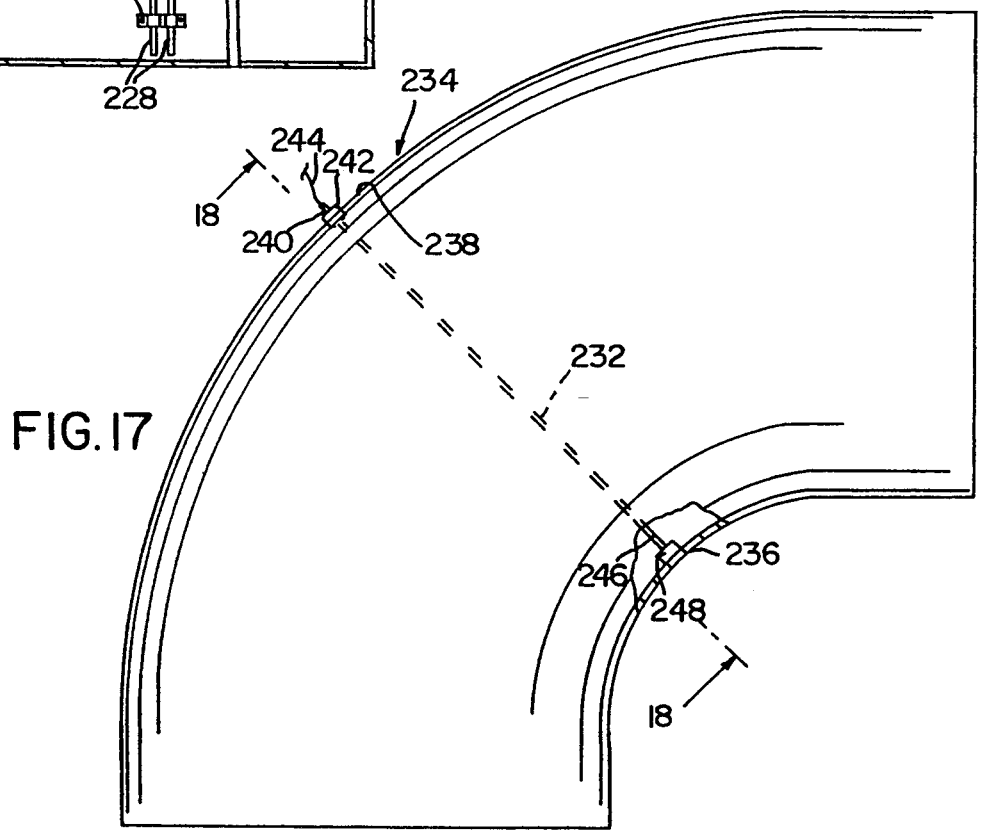

METHOD OF MAKING AVERAGE MASS FLOW VELOCITY MEASUREMENTS

This is a divisional of copending application Ser. No. 07/543,337 filed on Jun. 25, 1990, now U.S. Pat. No. 5,167,153.

BACKGROUND OF THE INVENTION

1. Field of the Invention

The present invention relates to electrical resistance temperature sensors or detectors (RTDs), and it relates more particularly to a long, slender, continuous RTD capable of sensing continuously over an extended field.

2. Description of the Prior Art

Both thermocouples and resistance temperature sensors (RTDs) are in widespread use for sensing temperature and providing an electrical output representative of the temperature sensed. Thermocouples, by their nature, are point sensors because they thermoelectrically produce an e.m.f. at a specific junction between two different metals. RTDs employ a wire sensing element which has a resistance that varies according to temperature. Present RTDs are designed to concentrate the electrical resistance at a small point or in the smallest possible volume, with miniaturization being a principal feature so that RTDs are, like thermocouples, essentially point sensors. Because of this point sensing feature of both thermocouples and RTDs, wherever an extended field is to be interrogated with the use of either thermocouples or RTDs, it has heretofore been necessary to distribute a multiplicity of thermocouples or RTDs at selected points in the field. No matter how many point sensing thermocouples or RTDs are distributed in a field, they still are unable to provide an accurate analog representation of the information to be determined from the field, because they are still only sensing specific points in the field. Determining the best points to interrogate, installing the individual thermocouples or RTDs, and making the numerous required individual electrical connections to the point sensing thermocouples and RTDs as is currently done is cumbersome and expensive.

One type of sensing of an extended field by the point sensing thermocouples and RTDs is sensing of the average temperature of a field. It will be apparent that the larger such a thermal field is, and the more varied the temperatures across the thermal field, the more point sensing thermocouples or RTDs are required to obtain an average readout which is fairly representative of the average temperature of the field.

Another type of extended field interrogation currently made with thermocouples or RTDs involves gauging of the level or location of a phase change interface, such as the liquid level, or interface between liquid and gas, in a tank. Such liquid level gauging is currently accomplished with thermocouples and RTDs by arranging a series of spaced thermocouples or RTDs along the height of the tank, i.e., at vertically separated points in the field being interrogated. Where RTDs are employed for this purpose, a series of heated RTDs and companion reference RTDs are employed along the height of the tank. As liquid reaches each RTD point sensor, the sensor reports that it is wet when it becomes cooled by the higher thermal dispersion rate of the liquid than the air above it. However, the operator is unable with such point sensing to determine whether the liquid level is just at that particular point or at any level between that point and just below the next higher RTD sensing point. Further filling of the tank will result in discrete reports from the sequentially higher RTDs, while lowering of the liquid level in the tank will cause successive discrete reports from successively lower RTDs as they are uncovered from the liquid. For example, if ten sensing points are employed along the height of the tank, each with an individual heated RTD sensor and a reference RTD sensor, the gauging can only be performed at ten individual stepped points, with total uncertainty of where the liquid level is between the points. The only way to reduce such uncertainty is to increase the number of sensing points, at correspondingly increased expense. A liquid level sensing system of this type is disclosed in applicant's U.S. Pat. No. 4,449,403, issued May 22, 1984 for "Guide Tube Inserted Liquid Level Sensor."

Accurate liquid level sensing is of critical importance in liquid storage vessels and reactor buildings and in the reactor vessels themselves of nuclear power plants to avoid accidents such as that at the Three Mile Island plant, where liquid level was misinterpreted. Where a series of vertically arrayed point sensing thermocouples or RTDs is employed to determine liquid level, not only is there a lack of desired accuracy by not knowing where the liquid level is between the sensing points, but liquid level changes may not be immediately sensed, since there can be a considerable change in liquid level prior to detection, so that a developing problem may not be immediately detected, and therefore mitigating action to suppress the problem would not be promptly taken by the operator.

Since each of the vertical sequence of thermocouples or RTDs in such present liquid level gauging systems requires its own separate electrical connections to the detection circuitry, the required large number of electrical joints or splices results in undesirably low reliability, which could be dangerous in the nuclear power plant environment. As an illustration of how serious this problem can be, applicant is familiar with one point-sensing RTD system for gauging water level in a nuclear reactor building which has as many as fifty RTD sensors arrayed over a vertical height of approximately sixty feet.

RTDs are generally preferred for some purposes over thermocouples for most uses because they can be made much more sensitive, being able to provide an output signal many times greater than thermocouples. This is because RTDs operate with an external electrical power source, which can provide as high a voltage or current as is desired, whereas thermocouples operate on the basis of a self-generated junction e.m.f., which inherently has a very low output voltage level as well as other inaccuracies. Nevertheless, for sensing some extended fields, such as the inside of a nuclear reactor vessel, access may be difficult, and best achieved by encasing a series of the sensors in a long, slender tubular probe. Such a probe can readily be inserted in an existing reactor vessel instrument guide tube. While it would be desirable to have RTDs so packaged because of their high output, and hence sensitivity, current state of the art RTDs are not suitable for such packaging, being much too bulky, and having a ceramic or glass insulator too brittle to allow them to be deformed as would be required for packaging them in such a long, slender tubular probe. Thermocouples, on the other hand, have been known to be packaged inside a metal casing as small as 0.010 inch in diameter, and a series of such encased thermocouples and the required electrical leads placed inside a tube and encased by drawing or swaging the tube down around the thermocouples and leads to produce a long, slender probe suitable for gaining access to constricted regions inside a nuclear reactor vessel. However, such thermocouple probes have serious disadvantages. First, the thermocouples are delicate and are easily subject to breakage during the manufacture of such probes or upon accidental impacting. Also, because of their inherent point sensing, the thermocouple-type probes necessarily have a step function output, rather than a continuous output, so liquid level cannot be accurately determined. Further, the electrical output of the thermocouples is so small that performance is grainy and resolution and accuracy are poor. Also, individual wire leads are required for each of the thermocouples, so that numerous wires must extend along the tube of the probe, which seriously limits how small the outside diameter of the tubular probe can be, and of course the larger the number of thermocouples placed along the probe in an attempt to increase resolution, the greater the number of leads. The large number of leads also seriously reduces the reliability of such thermocouple-type probes. Such thermocouple-type probes are also quite expensive to make, and it is even more expensive to provide leads, connections and electronic cooperating devices for thermocouple-type probes.

Another type of extended field which has been interrogated by a multiplicity of RTDs or thermocouples is a large duct having a nonuniform flow profile, where it is sought to obtain an average reading of the flow velocity in the duct. Such nonuniform flow distributions exist, for example, in air ducts where diameters are large and fittings such as tees, elbows, transitions, bends, section changes, louvers, dampers, and the like cause flow disturbances. Nonuniform flow distributions also typically occur in the input air ducts and combustion output ducts of fossil fuel power plants. In such cases, a multiplicity of point sensing RTD or thermocouple sensors are placed at what are considered to be strategic locations across the air or gas flow path, but only a rough approximation of the flow velocity can be obtained by use of such discrete, point sensing locations. Again, these individual RTD point sensors suffer from high costs of leads, connectors, and mating electronic devices that cooperate in interpreting the individual signals.

SUMMARY OF THE INVENTION

In view of these and other problems in the art, it is a general object of the present invention to provide an RTD of very long, thin configuration suitable for interrogating an extended field.

Another general object of the invention is to provide a long, thin RTD which, disposed along or across an extended field, is capable of serving the same sensing function as a multiplicity of point sensing-type RTDs or thermocouples distributed over the field, and which therefore may be considered as a unitary distributed RTD.

Another object of the invention is to provide a long, thin distributed RTD which is capable of providing infinitessimally continuous, uninterrupted sensing, as compared to the discontinuous, interrupted, step function-type sensing of conventional point sensing RTDs and thermocouples.

Another object of the invention is to provide a distributed RTD which has a high degree of sensitivity and has an output with excellent resolution.

Another object of the invention is to provide a long, thin distributed RTD which may be made as long as desired for spanning any particular field to be sensed.

Another object of the invention is to provide a long, thin distributed RTD of the character described which is flexible such that it can be rolled up for convenience of storage, shipping, and installation in cramped quarters.

A further object of the invention is to provide a distributed RTD capable of providing an accurate analog representation of information sensed in an extended field, as compared to an averaging of specific finite points in the field or a step function output of the level or location of a phase change interface such as the liquid level in a tank.

A further object of the invention is to provide a long, slender distributed RTD which is capable of accurately sensing the average temperature of an extended field.

A further object of the invention is to provide a distributed RTD of the character described, which, when deployed as a matched pair along the vertical height of a tank, is capable of accurately gauging the liquid level in the tank on a continuous, uninterrupted basis.

A still further object of the invention is to provide a distributed RTD of the character described which is capable, deployed as a matched pair, of measuring the average mass flow velocity of gas flow in an irregular region of a large duct where there is nonuniform flow velocity distribution.

Yet another object of the invention is to provide, for the first time, RTD packaging which is long, thin, and continuous, and which can be made even thinner than multiple channel thermocouple probes for sensing in fields normally difficult to access such as inside a nuclear reactor vessel, yet which has the high sensitivity and resolution capability of RTD sensors.

Another object of the invention is to provide a distributed RTD sensor capable of sensing over an extended field, yet which has a high degree of reliability because it requires only a minimum number of electrical connections, and because its operative filaments are well protected in a strong outer metal casing or sheath. The outer casing may be provided with spring-like flexibility and toughness which avoids likelihood of impact damage to the RTD and heater filaments or of sharp bends or kinks being formed therein from handling, and enables the long, thin distributed RTD to be rolled up for convenience of storage, shipping, and installation in cramped quarters.

A further object of the invention is to provide a distributed RTD of the character described which is relatively inexpensive to manufacture, and which is particularly inexpensive to install because it does not require the numerous attachments and many electrical connections and junctions associated with point sensing thermocouples and RTDs distributed about an extended field.

A still further object of the invention is to provide a distributed RTD of the character described wherein RTD filament material may be nonlinearly arranged along its length so as to accommodate or compensate for a nonlinear field.

A still further object of the invention is to provide a long, thin distributed RTD of the character described wherein portions thereof may be so arranged as to provide a step function output.

Another object of the invention is to provide a distributed RTD sensor of the character described in which the conductors connecting the RTD and heater filaments of the sensor to remote detection circuitry are housed in the same continuous outer sheath as the sensor filaments to avoid any junctions near the region being sensed.

Yet another object of the invention is to provide a method of increasing sensitivity of distributed RTD devices of the invention to mass fluid flow which involves utilizing relatively larger amounts of the RTD material in regions of relatively slower fluid flow.

An additional object of the invention is to provide configurations and methods for correlating equal incremental lengths of the distributed RTDs of the invention with equal areas in ducts to provide a signal output truly representative of average mass flow rates through the ducts.

According to the invention, an RTD sensing device is provided in a long, thin, linear configuration capable of spanning and interrogating an extended field. The basic structure of the invention in its simplest form consists of an elongated, thin, tubular outer sheath preferably made of a ductile metal such as stainless steel or other suitable metal, or made of other tough material such as plastic, that is capable of being drawn out from a relatively short, thick starting stage to the final long, thin configuration. An elongated body of electrical insulation material, preferably mineral insulation material such as alumina or magnesia, is contained within the outer metal sheath and extends longitudinally generally coextensively with the sheath. At least one long, thin filament of RTD material is supported within the insulation body and extends longitudinally generally coextensively with the insulation body and the sheath, the RTD filament along its length being transversely physically separated from and electrically insulated from the sheath by the insulation body. Electrical connections are made to end portions of the RTD filament for connection to detection circuitry, which may be of either the constant voltage type or the constant current type. A simplified form of RTD according to the invention does not include a heater filament as a companion to the RTD filament, and this form has utility as a linear thermometer adapted to have its length disposed across or along an extended nonisothermal temperature field for sensing the average temperature of the field, as compared to the conventional costly deployment of a multiplicity of point sensing RTDs or thermocouples.

A distributed RTD of the invention which does not have an internal heater filament may be made as a heated distributed RTD by making the outer sheath out of a high resistance ductile metal, and electrically energizing the sheath so that it will serve as a heater.

The other forms of the invention include one or more electrically energizable heater filaments generally coextensive with one or more RTD filaments, the heater filament or filaments being supported in the insulation body so as to be thermally coupled with the RTD filament or filaments but physically separated and electrically insulated from the RTD filament or filaments. The heater-type distributed RTDs of the invention are particularly useful for gauging liquid level on a continuous, linear, nonstepped basis, and for measuring the average mass flow velocity of gas flowing in an irregular region of a large duct where the irregularity causes nonuniform flow velocity distribution. For such uses of the heater-type distributed RTDs of the invention, they are preferably deployed in matched parallel pairs, with the heater filament or filaments of one of a matched pair being energized, while the heater filament or filaments of the other is left unenergized, the unheated distributed RTD serving as a thermal reference.

In preferred forms of the invention, a plurality of RTD filaments each extend the length of the distributed RTD, and are electrically connected preferably in series so as to multiply the sensitivity and resolution of the distributed RTD. By utilizing an even number of such series-connected filaments, both of the outside electrical connections are enabled to be made at one end of the distributed RTD, which makes connection to detection circuitry much more convenient than if connections must be made from both ends of the very long distributed RTD.

All of the long, thin, linear forms of the invention are made by initially providing the outer sheath, insulation body, and RTD and heater filaments in relatively short, thick form, assembling them in such form, and then swaging and/or drawing the assembly as a unit in a series of passes out to its final very long, thin configuration, and during such swaging and/or drawing the parts remain in their same relative proportions and locations.

In some forms of the invention, the effective length of RTD filament is greatly increased for increase of sensitivity and resolution by arranging the RTD filaments in a long, thin, helical array. This is accomplished by employing one or more extremely long linear forms of the invention helically coiled along a thin tubular mandrel which preferably houses the heater filaments.

For most purposes, it is desired to have a sensitivity of the distributed RTD which is linear along its length. However, the helical form of distributed RTD may have its coils wound nonlinearly so as to provide any desired nonlinear sensitivity along the length of the helical distributed RTD. Similarly, a step function may be provided along the length of the helical-type distributed RTD of the invention by having a series of helical clusters regularly or irregularly spaced along the length of the helical RTD, the clusters providing high sensitivity steps, with the clusters being interconnected by straight, axial RTD sections of relatively low sensitivity.

The step function may alternatively be accomplished in distributed RTDs of the invention by employing one or more heater filaments that are segmented into alternate high resistance and low resistance sections, the high resistance sections providing high sensitivity for the coextensive sections of RTD filament, and the low resistance sections providing regions of low sensitivity for the coextensive sections of RTD filament. A similar step function can be provided by employing one or more RTD filaments that are segmented into alternate RTD and non-RTD sections, or alternate sections of high and low RTD sensitivity. A step function can also be accomplished by employing alternating sections of insulation material having high and low thermal conductivity.

A form of the invention which is particularly useful in atomic power plants has the conductors connecting the RTD and heater filaments of the sensor to remote detection circuitry housed in the same continuous outer sheath as the sensor filaments to avoid junction boxes or other connecting devices in sensitive areas.

All forms of the present invention may be made very long and very thin. Thus, linear or nonhelical forms of the invention can be made with an outside diameter as small as from approximately 0.010 inch to approximately 0.030 inch, and can be made as long as several hundred feet if desired. A helical form of the invention with a single helix layer can be made with an outside diameter as small as approximately ⅛ inch, and in lengths of sixty feet or more if desired.

BRIEF DESCRIPTION OF THE DRAWINGS

These and other objects of the invention will become more apparent when taken in conjunction with the drawings, wherein:

FIG. 1 is a diametrically enlarged, fragmentary perspective view of a form of the invention which has a single RTD filament and does not include a heater filament;

FIG. 2 is a greatly enlarged transverse sectional view taken on the line 2—2 in FIG. 1;

FIG. 3 is a fragmentary axial section, partly in elevation, taken on line 3—3 and the scale of FIG. 2, showing the distributed RTD of FIGS. 1 and 2;

FIG. 4 is a billet-like starting assembly which is to be swaged and/or drawn to produce the distributed RTD of FIGS. 1-3;

FIG. 5 is a view similar to FIG. 1, but illustrating a distributed RTD of the invention having both an RTD filament and a heater filament;

FIG. 6 is a greatly enlarged transverse sectional view taken on the line 6—6 in FIG. 5;

FIG. 7 is a fragmentary axial sectional view, partly in elevation, taken on the line 7—7 in FIG. 6 and having the same scale as FIG. 6;

FIG. 8 is a greatly enlarged, fragmentary axial sectional view, partly in elevation, illustrating another form of the invention which has a pair of RTD filaments electrically connected in series, and a single heater filament.

FIG. 9 is a transverse sectional view taken on the line 9—9 in FIG. 8 and having the same scale as FIG. 8;

FIG. 10 is a greatly enlarged, fragmentary perspective view which is axially sectional with portions in elevation, illustrating a further form of the invention which has four RTD filaments electrically connected in series, and a single heater filament;

FIG. 11 is a view similar to FIG. 10, but illustrating another form of the invention which has a pair of RTD filaments electrically connected in series, and a pair of heater filaments electrically connected in series;

FIG. 12 is a greatly enlarged, fragmentary axial sectional view, with portions in elevation, illustrating a helical form of the invention having a linear distributed RTD of the invention helically coiled in a single layer, and with phantom lines indicating the great length of the helically coiled distributed RTD relative to its diameter;

FIG. 13 is a still further enlarged, fragmentary axial sectional view, partly in elevation, taken on the line 13—13 in FIG. 12, showing the closed end portion of the linear distributed RTD which is helically coiled in the helical distributed RTD of FIG. 12;

FIG. 14 is a greatly enlarged, fragmentary axial section, partly in elevation, taken on the same scale as FIG. 12, showing another helical form of the invention in which the helically coiled linear RTD element is encased in a potting or other filler material for protection of the coil;

FIG. 15 is a greatly enlarged, fragmentary axial section, partly in elevation, similar to FIG. 12 but on a somewhat smaller scale, illustrating a double helical form of the invention having two linear RTDs helically coiled in two layers along the length of the helical RTD;

FIG. 16 is a fragmentary vertical section, partly in elevation, illustrating a tank with a matched, parallel pair of distributed RTDs of the invention vertically deployed along a wall of the tank for liquid level gauging;

FIG. 17 is a side elevational view, with a portion broken away, illustrating a duct elbow with a matched pair of distributed RTDs of the invention deployed across it;

FIG. 18 is a transverse sectional view, with portions shown in elevation, taken on the line 18—18 in FIG. 17, with the diameters of the distributed RTDs exaggerated relative to their lengths for illustrative purposes;

DETAILED DESCRIPTION

Figure 19:
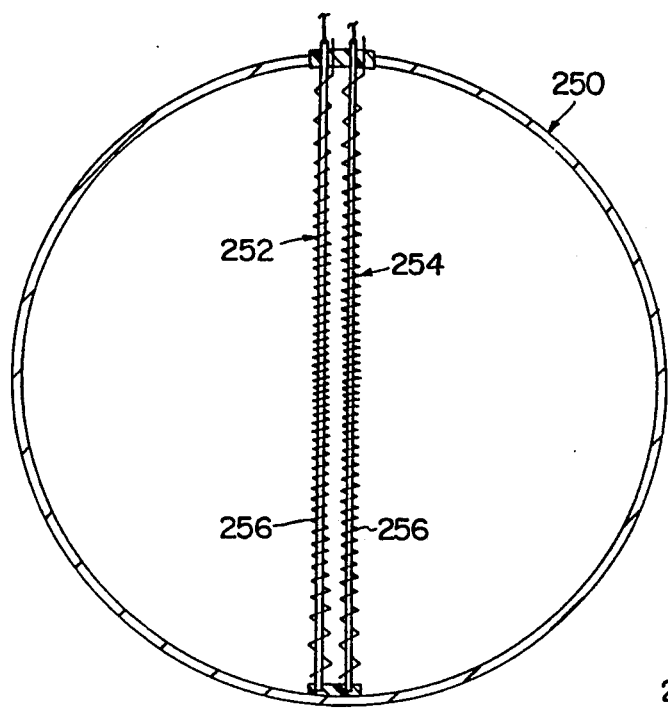
FIG. 19 is a transverse vertical section, partly in elevation, illustrating a right circular cylindrical tank laid on its side, with a matched pair of the helically coiled form of distributed RTDs of the invention vertically deployed in the tank, the pair of distributed RTDs being diagrammatically illustrated as having the coils of the helical winding variably separated along their lengths with the winding variations characterized to represent the curvature of the tank so as to provide a linear output representing liquid quantity in the tank.

FIGS. 1-3 illustrate a temperature sensing form of the present invention which embodies a long, slender RTD sensing element encased in an inner cylindrical electrical insulation body, preferably of mineral insulation material, which, in turn, is encased in a cylindrical outer sheath which is preferably made of metal, but alternatively may be made of other tough material such as a suitable plastic. This form of the invention does not include the long, slender heater element which is a companion to the RTD element in other forms of the invention. The form of the invention illustrated in FIGS. 1-3 is a distributed RTD temperature sensor adapted to have its length disposed across or along an extended field for continuous interrogation or sensing of the average temperature of the field, as compared to the costly conventional procedure of employing a multiplicity of "point" sensing thermocouples or RTDs with their numerous required individual electrical connections.

The distributed RTD of the invention, including the simplified form illustrated in FIGS. 1-3 and the other forms of the invention disclosed in the other figures of the drawings and described hereinafter in detail, has a very long, very thin configuration, which is a primary novel feature of the present invention in the RTD art, which has heretofore been directed principally toward miniaturization of RTDs to come as close as possible to "point" sensing. Distributed RTDs according to the invention may be made as long as required for spanning any particular field or zone, and if desired can be as long as several hundred feet. The cross-sectional dimension of distributed RTDs according to the invention, on the other hand, may be extremely small, as for example having an external diameter in the range of from approximately 0.010 inch to approximately 0.030 inch. Such long, thin configuration of RTDs according to the invention is enabled because the long, thin RTD sensor filaments of the invention are encased along their entire lengths first in a structurally stable mineral insulation body, and then in a tough, cylindrical outer sheath. Distributed RTDs according to the invention will generally be provided with a length that is greater than approximately 100 times its diameter, and in most instances it will be provided with a length that is hundreds, or even thousands, of times greater than its diameter.

The distributed RTD illustrated in FIGS. 1-3 is generally designated 10, and has a cylindrical outer sheath 12 with ends 14 and 16 which constitute the ends of distributed RTD 10. Outer sheath 12 constitutes the primary structural body of distributed RTD 10. Sheath 12 is preferably made of metal, preferably a stainless steel such as 316 stainless, which has a high degree of ductility, a requirement for enabling the sheath 12 to be swaged and/or drawn down from a much shorter, larger diameter cylindrical starting body. Sheath 12 also preferably has a high degree of corrosion and/or abrasion resistance, which is desirable because of the likelihood of the distributed RTD being subjected to an environment which is hostile chemically and/or mechanically. Alternatively, sheath 12 may be coated with other material to improve its corrosion and/or abrasion resistance. The swaging or drawing, or both, of sheath 12 to produce the very long, thin configuration of distributed RTD 10 preferably causes sheath 12, if made of metal, to be work-hardened during the last swaging and/or drawing pass or passes to a final condition of high strength and good spring characteristics. These physical characteristics of sheath 12, coupled with the internal compression provided by the mineral insulation body within sheath 12, give the overall assembly of distributed RTD 10 good structural strength, spring characteristics, and flexibility which avoid the likelihood of sharp bends or kinks being formed therein from handling, and enable the very long, thin distributed RTD 10 to be rolled up for convenience of storage, shipping, and installation in cramped quarters. Alternatively, the entire assembly of distributed RTD 10 can be annealed if desired.

While ductile metal is the presently preferred material for sheath 12, it is to be understood that the invention is not limited to the use of metal for sheath 12, and sheath 12 may alternatively be made of other tough, ductile material such as a suitable plastic capable of being swaged and/or drawn out to the final long, thin configuration from a shorter, larger diameter starting body.

Sheath 12 is filled, except for the presence of the RTD filament, along its entire length between ends 14 and 16 with an uninterrupted body 18 of electrical insulation material, which is preferably mineral. This is preferably alumina ($Al_2O_3$) or magnesia (MgO), which both have the favorable physical characteristics of high electrical resistance, good thermal conductivity, good compressional structural strength, good structural stability, and good thermal stability. The mineral material of insulation body 18 is composed of powdered mineral material which is obtainable compressed together with a binder as a continuous rigid block resembling a piece of chalk. Such mineral block material is referred to in the trade as "crushable mineral insulate," and is obtainable from such sources as Norton, Coors, and American Lava. It has the characteristic of being crushable and flowable so as to form coextensively with sheath 12 as sheath 12 is being swaged and/or drawn from an initial relatively short, thick configuration out to its very long, very thin final configuration.

An RTD wire filament 20 extends through the entire length of sheath 12 and insulation body 18, being coaxially centrally located within insulation body 18 so as to be electrically insulated from sheath 12 along its length. The RTD material of wire filament 20 is a material having a coefficient of electrical resistance that varies with variations in temperature, normally increasing for higher temperature. Platinum is the presently preferred RTD material, but other materials such as "Alumel," an alloy of aluminum and nickel, "Chromel," an alloy of chromium and nickel, "Balco," an alloy of iron and nickel, or copper, may be used. Each of these RTD materials has the required ductility enabling it to be swaged and/or drawn to the long, slender configuration of the finished distributed RTD 10. RTD filament 20 is preferably round in cross-section, as are outer sheath 12 and insulation body 18, and starts off as a relatively short cylindrical rod which is swaged and/or drawn down to a very long, thin wire filament concurrently with the swaging and/or drawing of sheath 12 and insulation body 18 so as to be coextensive in length with sheath 12 and insulation body 18.

Preferably, the ends of the distributed RTD 10 are dressed to a squared-off shape upon completion of the swaging and/or drawing operations, and RTD lead wires 22 and 24 are mechanically and electrically connected to the respective ends of the drawn RTD wire 20. Such connection is preferably a welded connection for strength and sure electrical continuity, and lead wires 22 and 24 may either be butt-welded to the respective ends of RTD filament 20, or some of the insulation material may be scooped out of the ends 14 and 16 of sheath 12 and the welds made within the ends 14 and 16 of sheath 12, insulation material then being backfilled into the end portions of sheath 12 so that the body 18 of insulation material remains uninterrupted. Welding current may be applied through the RTD wire filament 20 and the lead wires 22 and 24.

After lead wires 22 and 24 are thus applied, the ends of distributed RTD 10 are preferably covered with hermetic seals 25 which serve as moisture barriers.

Distributed RTD 10 is so long and has such an extremely small cross-section that it would be difficult to preform each of the parts 12, 18 and 20 to their final lengths and cross-sectional dimensions and then assemble them. Because of this, they are prefabricated and assembled in a billet-like starting assembly 26 such as that illustrated in FIG. 4, and then starting assembly 26 is swaged and/or drawn out to the final long, slender dimensions. Starting assembly 26 is provided in a length and of a diameter for convenience of assembly and with sufficient of the materials to produce the desired final length and diameter of distributed RTD 10. The initial length of starting assembly 26 may be on the order of 2–3 feet if desired, but this is a matter of choice. Starting assembly 26 includes cylindrical outer sheath or casing 12a, preferably of metal, having ends 14a and 16a, coaxial cylindrical insulation block 18a, preferably of mineral insulation material, and coaxial RTD rod 20a, the casing 12a, insulation block 18a, and RTD rod 20a preferably being coextensive in length, and being provided in the same relative diametral proportions as they are desired to be in the completed distributed RTD 10.

Insulation block 18a is externally preformed or machined to a cylindrical shape that will slideably fit into cylindrical casing 12a, and an axial hole may be preformed through the length of insulation block 18a to receive RTD rod 20a.

Conventional wire and tube swaging and drawing techniques may be employed, and if desired, either swaging, or drawing, or a combination of swaging and drawing techniques may be applied. The first drawing or swaging pass over the outside of sheath or casing 12a will tightly clamp casing 12a against insulation block 18a and tightly clamp RTD rod 20a within insulation block 18a along the length of starting assembly 26, with a close molecular fitting together of the parts such that the parts will be lengthened coextensively during all succeeding swaging and/or drawing passes until the desired final very long, very thin configuration of distributed RTD 10 is achieved. Annealing passes will normally be made between most of the swaging and/or drawing passes to keep casing 12a ductile for further forming. Such coextensive lengthening of the starting casing 12a, insulation block 18a, and RTD rod 20a will result in the same cross-sectional proportions of final sheath 12, insulation body 18, and RTD filament 20 in distributed RTD 10 as the starting cross-sectional proportions of casing 12a, insulation block 18a, and RTD rod 20a in the starting assembly 26, and RTD filament 20 remains centered in insulation body 18.

As indicated above for the distributed RTDs of the invention in general, the finished distributed RTD 10 shown in FIGS. 1–3 and formed from the billet-like starting assembly 26 shown in FIG. 4, may have an OD (outside diameter) as small as on the order of 0.010 to 0.030 inch, and a length as long as required to span a particular field or zone to be sensed, with lengths of several hundred feet being practical for the invention. The diameter for the completely swaged and/or drawn RTD wire filament 20 of distributed RTD 10 may be as small as approximately 0.003 inch, and the wall thickness for the swaged and/or drawn outer sheath 12 may be as little as approximately 0.002 inch.

The form of distributed RTD shown in FIGS. 1–3 which does not include a heater filament in association with RTD wire filament 20 is an accurate linear thermometer particularly adapted to measure the average temperature of a nonhomogeneous or nonisothermal temperature field or zone. Examples of such fields or zones are a tank of liquid having stratified temperatures, and a flow pipe or duct with nonuniform temperature media flowing therethrough. One or more of the distributed RTDs 10 may be deployed across such a nonisothermal temperature field to sense the average temperature of the field. In a situation such as a stratified tank of liquid where the stratification is normally in the horizontal direction only, a single one of the distributed RTDs 10 may be utilized in a vertically oriented deployment, or a plurality of parallel vertically deployed distributed RTDs 10 may be employed. In a situation where the isothermal temperature field is more complex in cross-section, not being regularly or predictably stratified, such as nonuniform temperature media flowing through a duct, a crossed matrix of two or more of the distributed RTDs 10 may be employed.

Although the nonheater-type distributed RTD of the invention has been shown in FIGS. 1–3 and described with a single RTD wire filament 20 having its lead wire terminations 22 and 24 at opposite ends of its length, it is to be understood that the nonheater form of the invention may have a plurality of parallel RTD wire filaments which are electrically connected in series or parallel, and which may terminate at the same end of the distributed RTD when Connected in series. Such multiple RTD filament arrangements are illustrated in FIGS. 8–11 of the drawings, which show forms of the invention that also include heater filaments.

Although the form of distributed RTD shown in FIGS. 1–3 does not include a heater filament, the outer sheath when made of metal may be utilized to provide the heating function, in which case the distributed RTD 10 of FIGS. 1–3 may be employed in the same manner and for the same purposes as the heater-type forms of the invention shown in FIGS. 5–15 as described hereinafter. In this case, the outer sheath will be made of a ductile metal having a high electrical resistance, and preferably has a resistance which does not change as a function of temperature over the operating temperature range of the distributed RTD, such as "Even-Ohm" material. Nichrome is also generally satisfactory for the purpose, and is particularly good for high temperature uses. In this case, the electrical connections for the heating current made at ends 14 and 16 of sheath 12. If this heatable distributed RTD is to be utilized for liquid level sensing in an electrically conductive liquid, the outer sheath is preferably coated with a layer of insulating material to avoid shorting.

Referring now to FIGS. 5-7, these figures illustrate a heater-type distributed RTD according to the invention which is generally designated 28, and includes a pair of parallel filaments, one of which is an RTD wire filament and the other of which is a heater wire filament. Distributed RTDs of the invention which include a heater wire filament are adapted for making several different types of measurements. Perhaps the most widely useful deployment of heater-type distributed RTDs of the invention is to provide continuous gauging of the level or location of a phase change interface; this usually being the liquid level or interface between liquid and gas, but may also be a liquid-to-liquid interface between nonmiscible liquids, or level of particulate matter in either liquid or gas. Another use of heater-type distributed RTDs of the invention is to measure the average mass flow velocity of gas flow in large ducts where a nonuniform flow velocity distribution is caused by flow disturbances from the presence of such fittings as tees, elbows, transitions, bends, section changes, louvers, dampers, and the like. Average mass flow velocity of any fluid, whether gas or liquid, in any conduit can be measured by heater-type distributed RTDs of the invention. The manner in which heater-type distributed RTDs of the invention are utilized to gauge liquid level and measure average flow velocity in a duct will be described in detail hereinafter.

Heater-type distributed RTDs of the invention may also be used for sensing the average temperature of a field or zone in the same manner as described above for the nonheater form of the invention shown in FIGS. 1-3, by simply not electrically connecting the heater element or elements to a source of current or voltage.

The heater-type distributed RTD 28 of FIGS. 5-7 has outer sheath 30, preferably of metal, as its primary structural basis, sheath 30 having ends 32 and 34. Sheath 30 is filled, except for the presence of both an RTD wire filament and a heater wire filament, along its entire length between its ends 32 and 34 with uninterrupted body 36 of electrical insulation material, which is preferably mineral. An RTD wire filament 38 and a heater wire filament 40 extend through the entire length of sheath 30 and insulation body 36, filaments 38 and 40 being in spaced, parallel relationship relative to each other, and both being spaced radially inwardly from the inner surface of sheath 30. Filaments 38 and 40 are preferably equally radially outwardly spaced from the axial center of insulation body 36, and are electrically insulated from each other and from the sheath 30 by the material of insulation body 36. The ends of distributed RTD 28 are preferably dressed to a squared-off shape, and RTD lead wires 42 and 44 are connected to the respective ends of RTD filament 38, lead wires 46 and 48 being similarly connected to the respective ends of heater filament 40. The ends of distributed RTD 28 of FIGS. 5-7 are preferably provided with moisture barriers such as seals 25 on the form of the invention shown in FIGS. 1-3.

The heater-type distributed RTD 28 of FIGS. 5-7 is manufactured in the same manner as the distributed RTD 10 of FIGS. 1-3, starting with a relatively short and thick billet-like assembly similar to the assembly 26, with the sheath, insulation body, RTD rod and heater rod in the same relative diametral proportions as the final very long, very thin sheath 30, insulation body 36, RTD wire filament 38, and heater wire filament 40. RTD filament 38 and heater filament 40 may have diameters as small as approximately 0.003 inch each, and the sheath 30 may have a wall thickness as small as approximately 0.002 inch. With the two filaments 38 and 40, the OD of distributed RTD 28 will be somewhat larger than 0.010 inch, but may still be as small as approximately 0.020 to 0.030 inch or less.

The materials of which sheath 30, insulation body 36, and RTD wire filament 38 are made are preferably as described hereinabove for the corresponding components of distributed RTD 10 of FIGS. 1-3. Heater wire filament 40 is made of nichrome or other suitable conventional metal heater material having relatively high electrical resistance and having the required ductility to be swaged and/or drawn to the very long, very thin configuration of distributed RTD 28. Distributed RTD 28 may be as long as desired for a particular use, as for example 60-100 feet, or even several hundred feet if desired.

FIGS. 8 and 9 illustrate a further heater form of the present invention in which the distributed RTD, generally designated 50, has a pair of RTD wire filaments extending substantially the length of distributed RTD 50, and a single heater wire filament thermally associated with both of these RTD wire filaments. In the embodiment shown in FIGS. 8 and 9, the RTD lead wire terminals come out of one end of distributed RTD 50, the other ends of the RTD wire filaments being interconnected so that the filaments are arrayed in series. This arrangement has several advantages. First, the double RTD material length afforded by the two RTD lead wires connected in series provides additive response with twice the sensitivity of a single RTD wire filament, and hence twice the resolution and accuracy capability for the information being sensed. Another important advantage of having the two RTD wire filaments arranged in series with their lead wires at the same end of distributed RTD 50 is that electrical connection to detection circuitry and current or voltage sources need only be made at one end of distributed RTD 50, which is much more convenient and involves much less conductor length than if such connections are required at both ends of the distributed RTD. For example, if distributed RTD 50 is vertically oriented through the height of a tank for continuous gauging of liquid level, then the electrical connections to detection circuitry and current sources can be made entirely from the top of distributed RTD 50, and need not come out through a wall of the tank or all of way up from the bottom to the top of the tank, as would be the case where connections were required at both ends of the distributed RTD. In the form 50 of the invention shown in FIGS. 8 and 9, the heater wire filament is shown with lead wire connections at both ends of distributed RTD 50. However, the heater filament need only receive current or voltage at one end, which will be the same end as has the two RTD filament lead wire terminals, and the other end of the heater wire filament may be electrically grounded to the sheath or elsewhere if desired.

Outer sheath 52, preferably of metal, forms the primary structural basis for distributed RTD 50, and has ends 54 and 56. Sheath 52 is filled between its ends 54 and 56 with insulation body 58, preferably of mineral insulation material, which is uninterrupted except for the presence of the pair 60 and 62 of spaced, parallel RTD filaments, and heater filament 64. Heater filament 64 is coaxially centrally located within the cylindrical insulation body 58 and sheath 52, and RTD filaments 60 and 62 are arranged parallel to heater filament 64 and equally radially outwardly spaced from heater filament 64. Thus, each of the RTD filaments 60 and 62 is electrically insulated from heater filament 64 and from each other, while at the same time, each of the RTD filaments 60 and 62 is thermally coupled to heater filament 64 through the material of insulation body 58.

The adjacent ends of the two RTD wire filaments 60 and 62 are electrically connected to each other proximate one end 56 of sheath 52, by means of a connection 65 which is preferably a welded connection. This connection 65 is preferably disposed within the sheath 52 adjacent its end 56 so that it can be covered with insulation material. This is accomplished by scooping out some of the material of insulation body 58 from within sheath end 56, effecting the connection 65 and arranging the connected end portions of RTD filaments 60 and 62 as best seen in FIG. 9 so that they are spaced from heater filament 64, and then providing a backfill 66 of insulation material out flush to sheath end 56 as shown in FIG. 8.

At the opposite end of distributed RTD 50 proximate sheath end 54, RTD filaments 60 and 62 are provided with respective lead wires 68 and 70. The opposite ends of heater filament 64 are provided with respective lead wires 72 and 74. The ends of distributed RTD 50 of FIGS. 8 and 9 are preferably provided with moisture barriers such as seals 25 on the form of the invention shown in FIGS. 1-3.

Distributed RTD 50 is manufactured in the same manner and with the same materials as described in connection with distributed RTDs 10 and 28 of FIGS. 1-7, and has the same very long, very thin overall configuration, being manufacturable in lengths up to several hundred feet as required for the particular region being sensed. The OD of distributed RTD 50 may be as small as approximately 0.020 to 0.030 inch.

FIG. 10 shows a distributed RTD, generally designated 76, which has generally the same construction as distributed RTD 50 shown in FIGS. 8 and 9, except that it has four RTD wire filaments instead of two, the four being connected together in series to present only two RTD filament ends at one end of distributed RTD 76. The four-RTD element distributed RTD 76 of FIG. 10 has the same advantage as the two-RTD element distributed RTD of FIGS. 8 and 9 in having its two RTD lead wire terminals located at the same end of distributed RTD 76, but has the further advantage of twice the sensitivity, and hence twice the read-out resolution and accuracy, as the two-RTD wire distributed RTD 50 of FIGS. 8 and 9, and four times the sensitivity and read-out resolution and accuracy as the single RTD filament forms 10 of FIGS. 1-3 and 28 of FIG. 5-7.

Distributed RTD 76 illustrated in FIG. 10 has outer sheath 78, preferably of metal, with ends 80 and 82, and continuous insulation body 83, preferably of mineral insulation material, extending substantially the entire length of sheath 78. The four RTD wires are designated 84, 86, 88 and 90, and are all parallel and uniformly spaced around insulation body 83, being equally radially spaced outwardly from the central longitudinal axis of insulation body 83. A single heater wire 92 is coaxially centered in insulation body 83, extending the length of distributed RTD 76. With this arrangement, the four RTD wires 84, 86, 88 and 90 are radially equidistant from heater wire 92 so as to have the same thermal coupling with heater wire 92 through the insulation material of body 83.

The ends of RTD wires 84 and 86 adjacent end 82 of sheath 78 are connected at 94, preferably by welding. The ends of RTD wires 86 and 88 are connected, preferably by weld 96, adjacent end 80 of sheath 78. The ends of RTD wires 88 and 90 are connected, preferably by weld 98, adjacent the end 82 of sheath 78. In this manner, the four RTD wire filaments 84, 86, 88 and 90 are arranged as a series circuit. Considering sheath end 80 to be at the front end of distributed RTD 76 and sheath end 82 to be at the rear end of distributed RTD 76, this series circuit starts at an exposed front end of RTD filament 84 extending to proximate the rear end through filament 84, then extending through RTD filament 86 back forwardly to proximate the front end, then extending back rearwardly through RTD filament 88 to proximate the rear end, and then extending back forwardly through RTD filament 90 which is exposed at the front end.

The rear ends of filaments 84 and 86 and their connection 94, and the rear ends of filaments 88 and 90 and their connection 98, are recessed within the rear end 82 of sheath 78, and covered with insulation backfill 99. Similarly, the front ends of filaments 86 and 88 and their connection 96 are recessed within the front end 80 of sheath 78 and covered with insulation backfill 100. The exposed front ends of RTD filaments 84 and 90 are provided with respective RTD lead wires 102 and 104, and the exposed front and rear ends of heater filament 92 are provided with respective lead wires 106 and 108. The ends of distributed RTD 76 of FIG. 10 are preferably provided with moisture barriers such as seals 25 on the form of the invention shown in FIGS. 1-3.

Distributed RTD 76 of FIG. 10 is made with the same materials and by the same procedures as described hereinabove in connection with other forms of the invention, and may be made as long as the other forms, and as thin as the distributed RTD form 50 illustrated in FIGS. 8 and 9.

FIG. 11 illustrates still another form of the invention wherein both RTD and heater filaments are provided in pairs so as to enable all electrical connections to be made at one end of the distributed RTD. Distributed RTD 110 shown in FIG. 11 has the usual sheath of the invention, designated 112, preferably of metal, with front and rear ends 114 and 116, respectively. Insulation body 118, preferably of mineral insulation material, extends through the length of sheath 112. A pair of spaced, parallel RTD wire filaments 120 and 122 extend longitudinally through insulation body 118, and their rear ends are connected at 124, which is preferably a welded connection. RTD lead wires 126 and 128 extend from the front ends of respective RTD filaments 120 and 122. Similarly, a pair of spaced, parallel heater wire filaments 130 and 132 extend longitudinally through insulation body 118 and are connected at their rear ends at connection 134, which is preferably a welded connection. Heater lead wires 136 and 138 extend from the front ends of respective heater wires 130 and 132. RTD filaments 120 and 122 and heater filaments 130 and 132 are all radially equidistant from the longitudinal axial center of insulation body 118 and sheath 11,2, and RTD filaments 120 and 122 and heater filaments 130 and 132 are alternately uniformly spaced about insulation body 118 so that each of the two heater filaments 130 and 132 has the same thermal coupling and effect on each of the RTD filaments 120 and 122. The rear ends of RTD filaments 120 and 122 and their connection 124, and the rear ends of heater filaments 130 and 132 and their connection 134 are recessed inside the rear end of sheath 112, and are covered with insulation backfill 140 and also preferably an end plug 142 which is preferably welded in the rear end 116 of sheath 112 to provide a moisture barrier. The front end of distributed RTD 110 of FIG. 11 is preferably also provided with a moisture barrier, such as one of the seals 25 on the form of the invention shown in FIGS. 1–3.

Distributed RTD 110 of FIG. 11 is made with the same materials and by the same procedures as described hereinabove in connection with other forms of the invention, and may be made as long as the other forms, and as thin as the distributed RTD forms of FIGS. 8–10.

The forms of the invention shown in FIGS. 1–11 may all be considered to be linear forms of distributed RTDs.

Although it is preferred to employ internal heater filaments in the forms of the invention shown in FIGS. 5–11, the heater for any of these embodiments may alternatively be the outer sheath where it is conductive, as of metal, in the manner described above for the embodiment of FIGS. 1–3.

Although the forms of the invention shown in FIGS. 8–11 which have a plurality of RTD filaments show these electrically connected in series, it is to be understood that a plurality of RTD filaments may alternatively be electrically connected in a parallel array, or if desired, they may each be independently electrically connected to detection circuitry, or may serve as redundant sensors.

FIGS. 12 and 13 illustrate another form of the invention in which the effective length of RTD filament is greatly increased for increase of sensitivity and resolution by arranging RTD filaments in a long, thin, helical array. The distributed RTD of FIGS. 12 and 13 is generally designated 144, and consists of an elongated axial inner heater core portion generally designated 146 and an elongated helical distributed RTD peripheral portion generally designated 148.

Referring at first to heater core portion 146, it is defined within a cylindrical sheath 150, preferably of metal, extending substantially the entire length of distributed RTD 144. Heater sheath 150, in addition to serving as a strengthener and support for the contained insulation body and heater filaments, also serves as a mandrel upon which a very long, thin, linear sheathed distributed RTD of the invention is helically wound. Helical distributed RTD 144 is illustrated in FIG. 12 with its longitudinal axis vertically arranged, which is the arrangement in which it is deployed when utilized to gauge liquid level in a tank. Since the lead wires are connected at the upper end, this end may be considered as the front end, while the lower end may be considered as the rear end. Heater core sheath 150 has an upper end 152 which registers with the upper end of distributed RTD 144, and a lower end 154 which is just inside the lower end of distributed RTD 144. Heater sheath 150 is filled along its entire length with insulation body 156, which is preferably of mineral insulation material, and a pair of spaced, parallel heater filaments 158 and 160 is supported in insulation body 156 along substantially its entire length. Heater filaments 158 and 160 are connected at their lower ends by connection 162, preferably a welded connection, which is inside the lower end portion of sheath 150. Insulation backfill 164 covers the connected lower ends of heater filaments 158 and 160, and a plug 166 at the bottom of heater sheath 150 covers the backfill 164. The upper ends of heater filaments 158 and 160 are exposed at the upper end of insulation body 156, and have respective lead wires 168 and 170 connected thereto.

Heater core portion 146 is made according to the procedure heretofore described in detail with respect to nonhelical or linear forms of the invention, commencing with a relatively short, thick starting assembly or billet, and then swaging and/or drawing it, with annealing steps as required, to its long, thin final configuration. The materials of heater sheath 150, insulation body 156, and heater filaments 158 and 160 are the same as those described hereinabove in connection with linear forms of the invention.

Helical peripheral portion 148 of distributed RTD 144 is a linear form of the invention similar to those previously described which is extremely long and very thin so as to be adaptable for helical winding on the mandrel furnished by heater sheath 150. Helical RTD peripheral portion 148 shown in FIGS. 12 and 13 is a sheathed distributed RTD generally designated 172 which has a pair of RTD wire filaments extending its length which are exposed at one end and connected and sealed in insulation material at the other end. Thus, distributed RTD 172 of FIGS. 12 and 13 may be the same as distributed RTD 50 illustrated in FIGS. 8 and 9 and described in detail in connection therewith, except for the absence of heater filament 64 of FIGS. 8 and 9, such heater filament not being necessary in distributed RTD 172 because of heater core 146 in helical distributed RTD 144. The already great length of RTD filament enabled by the helically wound configuration in distributed RTD 144 is thus doubled by the use of a pair of RTD wire filaments in distributed RTD 172, and having the pair of RTD filaments enables all electrical connections to be made at the upper end of helical distributed RTD 144. Alternatively, RTD filament length may be quadrupled by utilizing the RTD filament arrangement of FIG. 10.

The very long, linear distributed RTD 172 wound in the helix has outer sheath 174, preferably of metal, as its primary structural basis, the sheath having front, upper end 176 and rear, lower end 178. Sheath 174 is filled along its entire length with insulation body 180, preferably mineral, within which spaced, parallel RTD wire filaments 182 and 184 are supported. The lower, rear ends of RTD filaments 182 and 184 are connected at 186, which is preferably a welded connection, and are covered with insulation backfill 188 and end plug 190. The upper, front ends of RTD filaments 182 and 184 are exposed at the corresponding end of insulation body 180, and are provided with respective lead wires 192 and 194.

Linear distributed RTD 172 is made in the same way and with the same materials as the other linear RTDs of the invention. Linear distributed RTD 172 is preferably closely helically wound about heater sheath 150 with adjacent coils touching as illustrated in FIG. 12 to obtain a maximum amount of RTD filament length. However, if desired, overall RTD filament length may be varied by spacing the adjacent coils apart any selected amount. Normally, the spacing between adjacent coils will be the same along the entire length of helical distributed RTD 144 to provide a linear gauging or sensing function. However, the gauging or sensing function may be made variable along the length of helical distributed RTD 144 by varying the spacing between adjacent coils along the length of helical distributed RTD 144. Such a variable function helical distributed RTD will be described hereinafter in connection with the diagrammatic illustration of FIG. 19.

A cylindrical outer metal protective jacket 196 is coaxially disposed over coiled distributed RTD 172 along the entire length of helical distributed RTD 144, and the lower end of jacket 196 is covered with a bottom plug 198 to protect the lower end of the coil. Jacket 196 is made out of the same type of ductile metal as the outer metal sheathes of the linear forms of the invention, and is swaged and/or drawn into a tight fit over the coiled distributed RTD 172.

Helical distributed RTDs 144 will typically be made in lengths up to approximately 60 feet or longer for gauging liquid levels in tanks, and generally will be much shorter than that for measuring average flow velocity in a duct. The coiled linear distributed RTD 172 may have an OD as small as approximately 0.015 inch, which enables helical distributed RTD 144 to have an overall OD as small as approximately ⅛th inch. Helical distributed RTD 144 is thus still thin enough to be rolled up for convenience of storage, shipping, and handling in close quarters. The length of helical distributed RTD 144 will usually be several hundred times the OD. Several hundred feet of linear distributed RTD 172 which is helically wound is preferred for extremely high sensitivity and resolution of helical distributed RTD 144.

Although the helical form of distributed RTD has been shown in FIGS. 12 and 13 and described in detail hereinabove utilizing a heater core 146 and no heater filaments in the coiled linear distributed RTD 172, it is to be understood that the heater core may be omitted and alternatively one of the heater filament types of linear distributed RTDs of the invention employed as the coiled element. In such a helical distributed RTD, a cylindrical core like cylindrical core member 150 will serve as a mandrel for the coil, and internal insulation body 156 and heater filaments 158 and 160 omitted. The preferred coiled linear RTD element would then be the form illustrated in FIG. 11, which has self-contained heater filaments 130 and 132 along with the two RTD filaments 120 and 122, all four filaments having their lead wires coming out the same end of this form 110 of linear distributed RTD.

FIG. 14 illustrates another variation 144a of helical distributed RTD according to the invention in which the helically coiled linear RTD element is encased in a suitable potting or filler material such as epoxy resin as a protection against physical and chemical damage. This filler material may, if desired, be a suitable metal. Such potting or filler material will serve the same protective function as outer metal jacket 196 in the form shown in FIGS. 12 and 13, although it, too, may alternatively have the additional protection of an outer metal protective jacket of the type shown in FIGS. 12 and 13 for even further protection.

The other components of helical distributed RTD 144a of FIG. 14 are the same as the corresponding components of helical distributed RTD 144 of FIGS. 12 and 13. Thus, helical distributed RTD 144a has a heater core portion 146a and a helical distributed RTD peripheral portion 148a, core sheath 150a extending from an upper end down to a lower end 154a, with linear distributed RTD 172a coiled about the length of cylinder 150a. The generally rigid potting or filler material 200 fills the spaces between all of the adjacent coils of linear distributed RTD 172a along the entire length of helical distributed RTD 144a to provide a generally solid protective body. Despite the general rigidity of the potting or filler material 200, the very thin OD of helical distributed RTD 144a, as small as approximately ⅛th inch, nevertheless gives helical distributed RTD 144a the same spring-like flexibility as helical distributed RTD 144, enabling it to be rolled up for convenience.

FIG. 15 shows a further variation of helical distributed RTD according to the invention, wherein two layers of helically wound linear distributed RTDs of the invention are provided to double overall RTD filament length, and thereby double the sensitivity and resolution relative to the helical distributed RTD of FIGS. 12 and 13. The double helix form of distributed RTD of FIG. 15 is generally designated 144b, and is the same as helical distributed RTD 144 in all respects except the additional helically wound linear distributed RTD. Thus, double helix distributed RTD 144b has heater core portion 146b and double helical distributed RTD portion 148b. Core portion 146b has outer cylindrical metal sheath 150b, with an inner linear distributed RTD 172b of the invention coiled directly around sheath 150b, and an outer linear distributed RTD 202 helically wound around the outside of inner linear RTD 172b. By having two separate linear distributed RTDs 172b and 202, they are enabled to be coiled in the same direction so that the coils of the outer helix nest in the grooves between the coils of the inner helix for diametral compactness.

An outer metal protective jacket 196b is swaged and/or drawn over the outside of outer linear distributed RTD 202 along the entire length of the double helix distributed RTD 144b; and if desired, as an alternative or supplemental protective measure, both of the helical coils may be encased in the rigid potting or filler material of FIG. 14. Lead wires 192b and 194b connect to the two RTD filaments of inner linear distributed RTD 172b, and lead wires 204 and 206 connect to the RTD filaments of outer linear distributed RTD 202.

Despite the additional helical layer, the double helix distributed RTD 144b still can be as small as approximately 0.150 inch in OD, and has a spring-like flexibility enabling it to be rolled up.

Another way of increasing the effective length of RTD filament for increasing sensitivity and read-out resolution is to bundle a plurality of any of the long, thin distributed RTDs of the invention together in a parallel array within an outer jacket like jacket 196 of FIG. 12 or 196b of FIG. 15, and swage or draw the jacket down on the bundle to hold it firmly together. Corresponding lead wires of distributed RTDs may be connected together in series proximate the ends of the distributed RTDs so as to multiply the overall sensitivity of the bundle and also minimize the number of wires leading to detection circuitry. They may alternatively be connected in parallel, or may be individually connected to detection circuitry. They may also serve as redundant sensors.

Referring to FIG. 16, distributed RTDs of the heater types according to the invention are deployed in matched parallel, vertical pairs for liquid level sensing. These are preferably of the type wherein both heater filaments and RTD filaments have all of their electrical terminations at one end. Thus, the forms of the invention shown in FIGS. 11–15 are preferred for this purpose.

Such a matched pair of distributed RTDs is designated 208 and 210, and for maximum sensitivity and resolution, will be assumed to be either a pair of distributed RTDs 144 of FIGS. 12 and 13, 144a of FIG. 14, or 144b of FIG. 15. The pair of distributed RTDs 208 and 210 is deployed vertically in closely spaced, parallel relationship inside a tank generally designated 212 having side walls 214, a bottom wall 216, and a top wall 218. A series of mounting brackets 220 supports the two distributed RTDs 208 and 210 within tank 212, spaced inwardly from the mounting wall 214. The upper end portions 222 of distributed RTDs 208 and 210 extend upwardly beyond top wall 218' through a panel or plug member 224 set in top wall 218. This makes the lead wire bundles 226 of the two distributed RTDs 208 and 210 accessible above top wall 218. The lower ends 228 of distributed RTDs 208 and 210 may be disposed as closely as desired to the inside of bottom tank wall 216.

To operate the pair 208 and 210 of distributed RTDs for gauging liquid level in tank 212, the heater filament or filaments of one of the distributed RTDs 208 and 210 are energized, while the heater filament or filaments of the other distributed RTD are left unenergized. Assuming there is quiescent liquid in the tank up to a level such as that designated by phantom horizontal line 229, and still air in the rest of the tank above line 229, the relatively high density liquid will disperse heat away from the outer sheath of the heated distributed RTD much more efficiently than the relatively poor dispersion rate of air. Preferably, sufficient current or voltage is supplied to the heater filaments of the heated distributed RTD to heat the portion of it that is in air to a differential temperature of approximately 100° F. above the temperature of the unheated distributed RTD, which serves as a reference. The much more efficient thermal conductivity of the quiescent liquid will cool off the immersed portion of the heated distributed RTD to a differential temperature on the order of only about 10° F. above the unheated reference distributed RTD. As the liquid level 229 progressively rises in tank 212, a progressively greater length of the heated RTD is cooled off to the approximately 10° F. differential and a progressively shorter length of the heated RTD will still have the high, approximately 100° F. differential. Conversely, as liquid level 229 lowers in tank 212, a progressively greater length of the heated RTD will be uncovered above liquid level 229 and therefore subject to the high temperature differential of approximately 100° F., and a progressively shorter length of the heated RTD below liquid level 229 will be cooled to the low, approximately 10° F. temperature differential. The resulting continuous variation of electrical resistance in the heated RTD relative to the electrical resistance in the unheated RTD according to variations in liquid level in tank 212 will permit good accuracy, high resolution, smooth, continuous, linear, nonstepped gauging and analog reading of liquid level in the detection circuitry and instrumentation electrically connected to lead wire bundles 226 of the two continuous RTDs 208 and 210. Such high accuracy and resolution, continuous gauging not only enables the exact liquid level to be determined at any time, but also enables liquid level changes to be immediately sensed, as compared with prior art point sensing systems which could allow a considerable liquid level change to occur prior to detection. This also avoids the large expense associated with the many connections required to be made when point sensors are employed.

Figure 24:
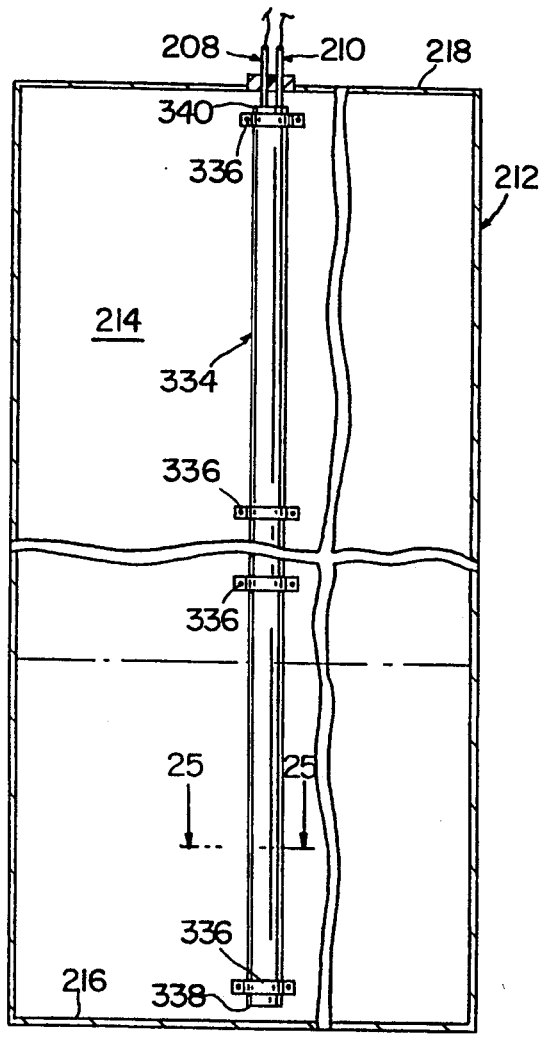
FIG. 24 is a view similar to FIG. 16, but with the distributed RTDs disposed within a still well to mitigate the effects of fluid turbulence.
Figure 25:
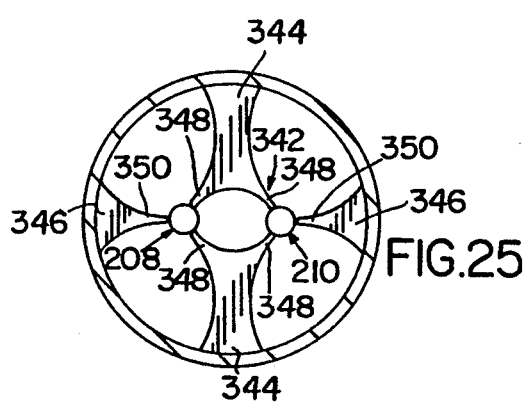
FIG. 25 is an enlarged, fragmentary, horizontal sectional view taken on the line 25—25 in FIG. 24.

In the event the liquid and/or air in the gauged vessel may be turbulent rather than quiescent, then greater cooling of heated distributed RTD 208 or 210 will be caused by the turbulence, and the aforementioned 10° F. and/or 100° F. temperature differential correspondingly decreased. If the turbulence is constant, the system can be calibrated in an equally turbulent environment, and provide readouts of satisfactory accuracy. On the other hand, if the turbulence is randomly varying such that variable values of cooling occur, the system can produce errors in the readout caused by the random turbulence. If such is the case, then a still well or stilling well can be provided which surrounds at least the heated distributed RTD, and preferably both the heated and unheated distributed RTDs so that it can also serve as a support for both, to mitigate the effects of the varying turbulence. Such a still well is illustrated in FIGS. 24 and 25 and described hereinafter in connection therewith.

FIGS. 17 and 18 illustrate use of a matched pair of distributed RTDs according to the invention to measure the average mass flow in a duct where a flow of nonuniform distribution exists. Such nonuniform flow distributions exist, for example, in air ducts where diameters are large and fittings such as tees, elbows, transitions, bends, section changes, louvers, dampers, and the like cause flow disturbances. Another example of a large duct where it would be desirable to measure the average mass flow velocity or rate is the input air duct to and/or the combustion products output duct from a fossil fuel power plant. The matched pair of distributed RTDs in FIGS. 17 and 18 is designated 230 and 232, and these are heater-type RTDs according to the invention, preferably one of the types of FIGS. 11–15 which have electrical connections at one end. The pair of distributed RTDs 230 and 232 is shown deployed in spaced, parallel relationship to each other diametrically across an air duct elbow 234 in the direction from the smallest radius of curvature at the inside 236 of the duct bend to the largest radius of curvature at the outside 238 of the duct bend, this being the direction of greatest nonuniformity of flow distribution but symmetrical in the normal axis.

The front end portions 240 of distributed RTDs 230 and 232 which carry the lead wires extend externally of the wall of the duct through a suitable support body 242 in the region of the outer curvature 238 of the elbow, with lead wire bundles 244 accessible for connection to the detection circuitry and current or voltage source. The rear end portions 246 of distributed RTDs 230 and 232 are secured in a suitable internal support body 248 in the region 236 of the inner curvature of the elbow.

The heater filaments of one of distributed RTDs 230 or 232 are energized, and the heater elements of the other are not, the unheated distributed RTD serving as a reference. The flowing air cools the heated distributed RTD as a function of the mass flow rate passing the heated RTD. Relatively high flow rates near the longer outer curvature region 238 of the elbow will cool that portion of the heated RTD to a greater degree than the cooling that will occur near the shorter inner curvature region 236 of the elbow, and the resulting sensed output of RTD filaments in the heated distributed RTD as compared to the sensed output of RTD filaments of the unheated distributed RTD will provide an excellent summation and average of the mass flow rate passing the matched pair of distributed RTDs 230 and 232.

If additional flow rate information is desired for the summing and averaging of the flow rate in duct elbow 234, one or more additional matched pairs of spaced, parallel heated distributed RTD units like 230 and 232 may be deployed across elbow 234, in close to the same transverse plane across elbow 234, but offset angularly as viewed in FIG. 18 from the matched pair 230 and 232 of distributed RTDs, or if desired, a gridwork of crossing matched pairs of distributed RTDs like 230 and 232 might be deployed across duct elbow 234.

Figure 26:
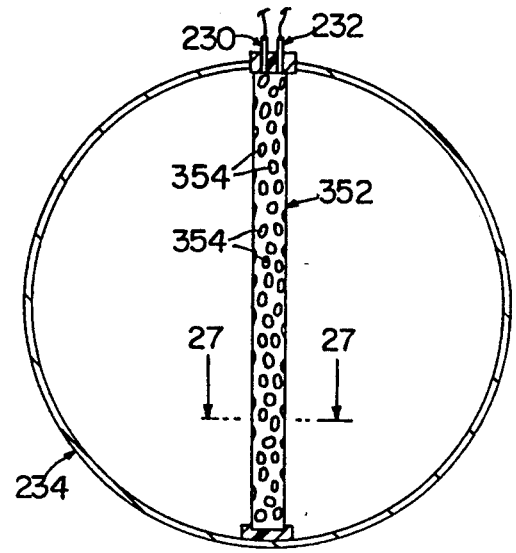
FIG. 26 is a view similar to FIG. 18, but with the distributed RTDs disposed within a perforated shroud to prevent signal saturation by high fluid flow velocities through the duct.
Figure 27:
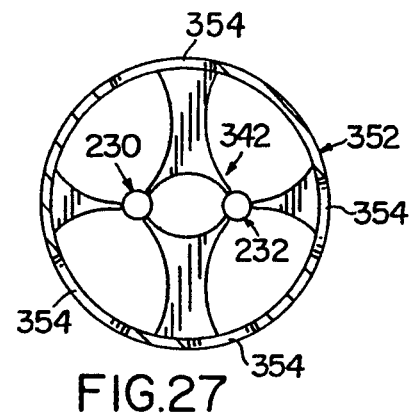
FIG. 27 is an enlarged, fragmentary sectional view taken on the line 27—27 in FIG. 26.

Should the mass flow rate be so high as to cool heated distributed RTD 230 or 232 to such a degree as to saturate its signal output, i.e., where increased flow rate causes little or no additional cooling, a shroud can be provided to increase the usable range. The shroud reduces the rate at which heat is dispersed from the heated distributed RTD into the flowing stream. Such a shroud is illustrated in FIGS. 26 and 27, and described in connection therewith.

Distributed RTDs 230 and 232 illustrated in FIGS. 17 and 18 are shown linearly arranged diametrically across duct elbow 234. However, the cross-sectional area of duct 234 varies nonlinearly in the direction of the axis of distributed RTDs 230 and 232 (the vertical axis in FIG. 18). In order to provide a signal output truly representative of mass flow rate where flow is symmetrical about a diametrical axis as in FIG. 18, the distributed RTDs should be configured such that each incremental length thereof is proportional to the corresponding incremental area of the duct in which it lies; that is, the distributed RTDs should be configured so as to respond as a variable function that is proportional to duct area along their lengths. This can be accomplished in the same manner as shown and described with reference to FIG. 19 for liquid volume gauging with reference to a right circular tank on its side. This can alternatively be accomplished by a sinuous or serpentine configuration of linear forms of the invention in the manner diagrammatically illustrated in FIG. 28 and described in connection therewith.

Where duct flow is symmetrical about the center axis of the duct, distributed RTDs of the invention can be arrayed in a spiral configuration such that incremental lengths thereof are proportional to corresponding incremental circular flow areas as diagrammatically illustrated in FIG. 29 and described in connection therewith.

Utilization of a matched pair of heater-type distributed RTDs of the invention in each of the liquid level gauging and mass flow rate sensing serves two purposes. First, the unheated distributed RTD, by having identical components as the heated distributed RTD, has an identical thermal response to the environment other than that response which is the result of energizing the heater, so that a true differential temperature response is provided by comparison of the output of the RTD filaments of the heated distributed RTD relative to the output of the RTD filaments of the unheated distributed RTD. Second, with the two matching distributed RTDs, if the heater should fail in one of them, then the heater of the other one may alternatively be energized. In this manner, only the external electrical connections need be changed, which can be done at the location of the detection circuitry, and then the formerly heated distributed RTD will serve as the reference distributed RTD, and the difficulty and expense of replacing the damaged distributed RTD is avoided.

FIG. 19 diagrammatically illustrates a variable function type of distributed RTD embodying the principles of the present invention. In the situation depicted in FIG. 19, a right circular cylindrical tank 250 is laid on its side, and it is desired to obtain a linear signal output indicating the volume of liquid contained in tank 250 from a matched pair 252 and 254 of spaced, parallel, vertically deployed heater-type distributed RTDs of the invention. The problem here is that with the cylindrical tank on its side, volume does not increase proportionally with liquid level so that linear function distributed RTDs of the invention, while indicating liquid level, would not indicate volume. The other forms of the invention described hereinabove in connection with FIGS. 1–15 are continuous linear function distributed RTDs. When tank 250 is being filled from its empty condition, as the liquid level first rises from the arcuate bottom of the tank, there is only a relatively small volumetric increase corresponding to liquid level height increase. As the liquid level rises further and further toward the vertical center of the tank, the amount of liquid volume increase per increment of liquid level height increase will become greater and greater until it is at a maximum at the vertical center of the tank. Conversely, as the liquid level further increases from the vertical center of the tank, the increments of volume increase per increment of height increase will gradually be reduced at first, and then will be reduced at a greater and greater rate, until only very small volume increases will correspond to increments of added liquid level height as the arcuate top of the tank is approached.

To automatically compensate for this variable function of volume relative to liquid level height in cylindrical tank 250 and provide an electrical output from the matched pair of distributed RTDs 252 and 254 which will provide a linear reading of liquid volume to the detection circuitry in the same manner as the matched pair 208 and 210 of distributed RTDs will for tank 212 in FIG. 16 which has a uniform horizontal cross-section for its entire vertical height, each of the matching distributed RTDs 252 and 254 in FIG. 19 is of the helically wound type, but has the coils of the winding variably separated along the length of the distributed RTD, with the winding variations characterized so as to represent the curvature of tank 250. Thus, each of the matched distributed RTDs 252 and 254 is of the type shown in FIGS. 12 and 13, or in FIG. 14, or in FIG. 15, but the helically wound linear heater-type distributed RTD 256 of each has its adjacent coils closely spaced proximate the vertical center of tank 250, and then the spacing gradually increases both upwardly and downwardly from the vertical center, and the increased spacing between adjacent coils becomes greater and greater as the top and bottom of the tank are approached, being greatest adjacent both the top and bottom of the tank. The coil spacing variation from the bottom to the top of tank 250 is arranged to register with the liquid volumetric variations relative to liquid level height, to provide the linear output of distributed RTD sensors 230 and 232 which indicates liquid level volume in tank 250.

It will be apparent from the diagrammatic illustration of FIG. 19 and the foregoing description relating to FIG. 19 that helical-type distributed RTDs of the invention may have coil spacings varied in any desired manner along their lengths to accommodate or compensate for any desired function, or to produce any desired output function. Alternatively, the nonlinearity or discontinuity of any tank shape or other field irregularity can be accommodated with a linear distributed RTD of the invention and electronic means such as microprocessor programming which converts the linear signal from the sensor into an actual volumetric or other desired field function that takes into account any nonlinearity or discontinuity in tank shape or other field irregularity.

Figure 20:
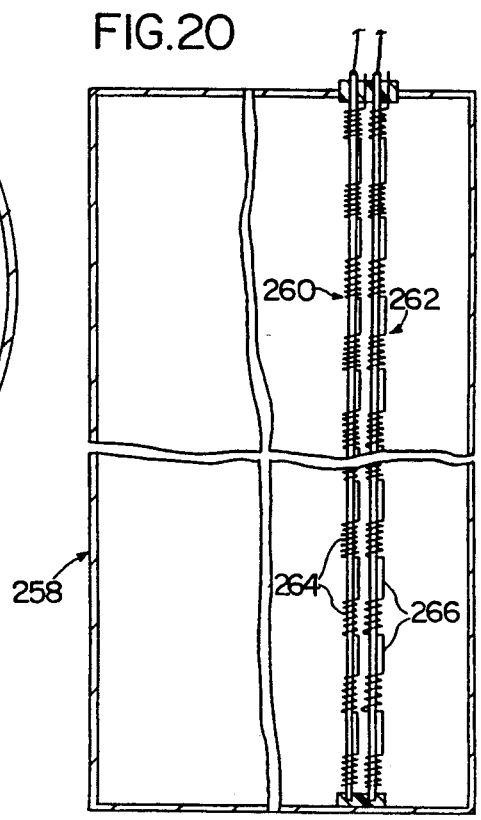
FIG. 20 is a fragmentary vertical sectional view, partly in elevation, illustrating a tank with a vertically deployed matched pair of diagrammatically illustrated distributed RTDs of the invention having alternating helical and straight RTD sections for providing a step function output with linear output between the steps.

FIG. 20 diagrammatically illustrates a helical winding arrangement for helical distributed RTDs of the invention which will produce a step function output. In FIG. 20, the liquid level in a tank 258 is being sensed by a pair of matching distributed RTDs 260 and 262 arranged vertically in spaced, parallel relationship. Each of the distributed RTDs 260 and 262 is of the heater type of the invention, and employs a very long, thin linear-type RTD of the invention which has alternating helically wound sections 264 and straight, axial sections 266 along its length. Helically wound sections 264 and straight sections 266 of the two distributed RTDs 260 and 262 are respectively in vertical registry. Other than the alternating helical and straight sections 264 and 266, respectively, the matching distributed RTDs 260 and 262 may be made in accordance with the structures of FIGS. 12 and 13, or of FIG. 14, or with the use of two overlapping coiled linear RTDs of the invention, according to the structure of FIG. 15. The liquid level sensing output of the pair of distributed RTDs 260 and 262 will be a stepped signal because of the very high response sensitivity of helical sections 264 relative to the response sensitivity of straight, axial sections 266.

Although step function-type distributed RTDs 260 and 262 are preferably employed as a matched pair with one serving as a reference, a single one of the distributed RTDs 260 or 262 may be employed for liquid level sensing by identifying and counting the discrete steps as liquid level rises from the bottom of the tank, and identifying and counting the steps as liquid level drops back down. By thus being able to sense liquid level with only a single long, thin distributed RTD probe according to the invention, access can be gained into regions which may be too constricted for a matched pair of distributed RTDs. An example of such a region would be certain points in some nuclear reactor guide tubes.

The helical sections or clusters 264 are shown regularly spaced and of uniform lengths along the lengths of distributed RTDs 260 and 262 in FIG. 20, which will produce a linear step function output signal. If a nonlinear step function output signal is desired, then a nonlinear or irregular spacing may be provided between helical sections 264, or helical sections 264 may be provided with irregular lengths.

As an alternative to the alternating helical and straight sections of distributed RTDs 260 and 262 shown in FIG. 20, linear-type distributed RTDs of the invention may be configured to have alternating curved sections such as transversely directed hairpin-shaped sections and straight sections to produce the step function response.

Figure 21:
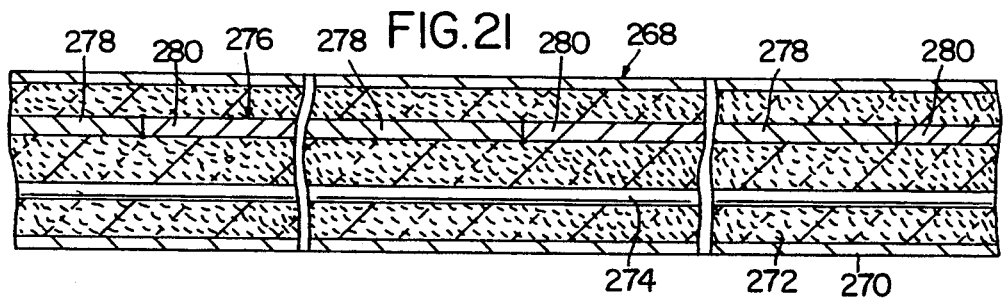
FIG. 21 is a greatly enlarged, fragmentary axial section, partly in elevation, illustrating another step function form of the invention in which the heater filament has alternating high resistance and low resistance sections.

Another way of providing a step function output for distributed RTDs according to the invention is illustrated in FIG. 21 which, for simplicity of disclosure, illustrates the concept in connection with a two-filament distributed RTD embodiment similar to that shown in FIGS. 5-7. The distributed RTD of FIG. 21 is generally designated 268, and has outer sheath 270, preferably of metal, inner insulation body 272, preferably of mineral insulation material, and RTD and heater filaments 274 and 276, respectively, extending in spaced, parallel relationship through the length of insulation body 272. RTD filament 274 is continuous as in the form of the invention shown in FIGS. 5-7. However, heater filament 276 is segmented into alternate high resistance sections 278 and low resistance sections 280 so as to provide the step function. The high resistance sections 278 may be of nichrome or other high resistance metal, while the low resistance sections 280 may be of copper or other low resistance metal. The alternating portions of RTD filament 274 adjacent high resistance heater filament sections 278 will be heated to a much greater temperature than the alternating portions of RTD filament 274 adjacent low resistance heater filament sections 280. The heated portions of RTD filament 274 will have a high degree of sensitivity to immersion in liquid, being cooled from perhaps 100° F. above ambient temperature down to perhaps 10° F. above ambient temperature, while the unheated portions of RTD filament 274 will have only minimal response to liquid immersion. Thus, the output of distributed RTD 268 will be in the form of a step function. As liquid level rises, each heated section of RTD filament 274 will be incrementally cooled and thus have a lowered electrical resistance to define the upward steps; while as liquid level drops, the heated sections of RTD filament 274 which are uncovered will become hot and their elevated electrical resistance will define the successive downward steps.

As with the form of the invention shown in FIG. 20, distributed RTDs 268 are preferably deployed in matched pairs for liquid level sensing, with only one of them having its heater filament 276 energized so that the other serves as a reference, but alternatively a single one of distributed RTDs 268 may be employed for liquid level sensing by identifying and counting the discrete steps as liquid level rises from the bottom of the tank and as liquid level drops back down.

As an alternative to the continuous RTD filament 274 and segmented heater filament 276 described above for FIG. 21, the heater filament may be provided in continuous form and the RTD filament may be segmented having alternate segments that are of highly responsive RTD material, and segments that have low resistance or are unaffected (or less affected) by heat.

Figure 22:
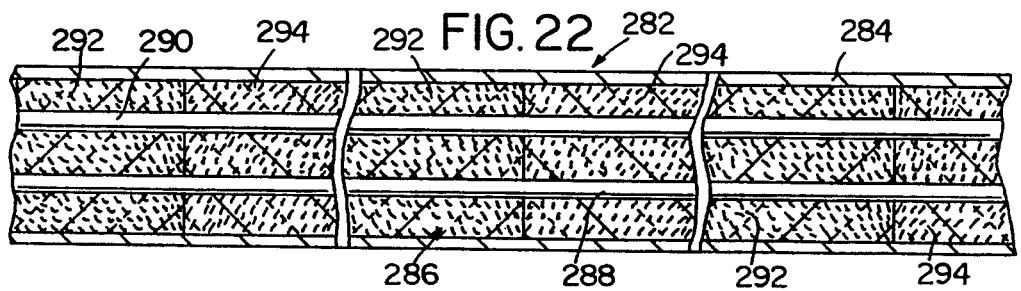
FIG. 22 is a view similar to FIG. 21, illustrating a still further step function form of the invention in which the insulation body has alternating sections of relatively high thermal conductivity and relatively low thermal conductivity.

FIG. 22 shows a further form of distributed RTD according to the invention which senses as a step function and correspondingly has a step function output. Distributed RTD 282 of FIG. 22 is a two-filament distributed RTD which is like distributed RTD 28 of FIGS. 5-7 except for having a segmented insulation body which provides the step function. Thus, distributed RTD 282 has outer sheath 284, preferably of metal, insulation body 286, preferably of mineral insulation materials, and RTD and heater filaments 288 and 290, respectively. Insulation body 286 is provided with alternate sections 292 having high thermal conductivity and sections 294 having low thermal conductivity, the difference in thermal conductivity being provided by the use of different types of insulation material for the sections 292 and 294. In this embodiment, heater filament 290 and RTD filament 288 are continuous, but the sections of RTD filament 288 within high thermal conductivity insulation sections 292 will be heated to a higher temperature than the sections of RTD filament 288 in low thermal conductivity insulation sections 294. Thus, the sections of RTD filament 288 in high thermal conductivity insulation sections 292 will have greater sensitivity than the sections of RTD filament 288 in low thermal conductivity insulation sections 292, providing the step function in the same manner as described above in connection with distributed RTD 268 of FIG. 21. As with forms of the invention shown in FIGS. 20 and 21, distributed RTD 282 of FIG. 22 is preferably employed in a matched pair with heater filament 290 of only one of the pair energized so that the other will serve as a reference, but liquid level measuring can be accomplished with a single distributed RTD 282 by counting the incremental output steps.

RTD filaments of the invention may be energized by either a constant voltage source or a constant current source, both of which are known to those skilled in the art. With a constant voltage source applied across the RTD filaments, the detection circuitry will be arranged to detect decreases in current through the RTD filaments for increases in temperature sensed by distributed RTDs of the invention, and conversely will detect increases in current for decreases in temperature. With a constant current source applied through the RTD filaments, the detection circuitry will be arranged to detect increases in voltage across the RTD filaments for increases in temperature sensed by distributed RTDs of the invention, and conversely will detect decreases in voltage for decreases in temperature. For forms of the invention shown in FIGS. 1–15, such current and voltage responses for the respective constant voltage and constant current source circuits will be smooth, continuous and linear. For the form of the invention diagrammatically illustrated in FIG. 19, the response will have a variable function representative of the curvature of the tank, but which will be a linear representation of the liquid level in the tank. For forms of the invention shown in FIGS. 20–22, the response will be a step function which will be linear along the lengths of the distributed RTDs.

In forms of the invention shown in FIGS. 8–15 which have a plurality of RTD filaments, these filaments have been shown and described as being electrically connected in series for additive response. This is preferred for a constant current source system, as otherwise each filament would require separate electrical connection to the detection circuitry, where the voltage changes across the individual RTD filaments would have to be added, instead of the voltage changes being added by the series connections right in the distributed RTDs. The series connection of the filaments will also work for a constant voltage system, provided the overall applied voltage is multiplied according to the number of RTD filaments to keep the same sensitivity of each filament. However, with a constant voltage system, the RTD filaments may alternatively be arranged in a parallel electrical array with minimal electrical connections to the detection circuitry, and in such case, the current change response to temperature change would still be additive, and the voltage would not have to be multiplied.

A simplified constant voltage-type detection circuit for use with matched pairs of distributed RTDs of the invention, where one of the distributed RTDs has its heater filament or filaments energized and the other distributed RTD has its heater filament or filaments unenergized for reference purposes, is shown in U.S. Pat. No. 3,366,942 to Deane and also in U.S. Pat. No. 3,898,638 to Deane and McQueen.

Figure 23:
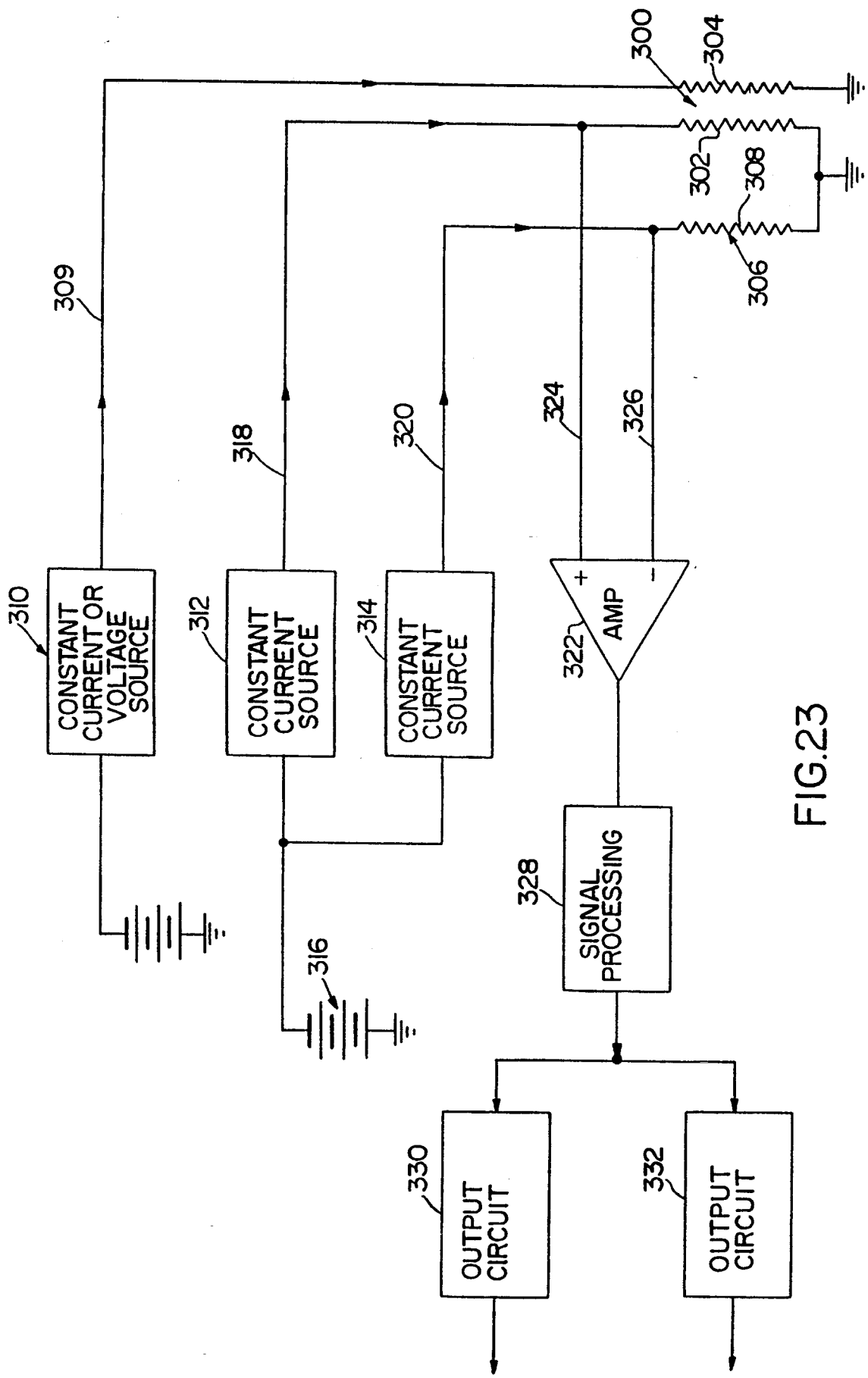
FIG. 23 is a block diagram illustrating a constant current circuit which may be utilized in connection with any of the forms of the present invention.

A simplified constant current-type detection circuit for use in connection with such matched pairs of distributed RTDs of the invention is shown in block diagram form in FIG. 23. Although single RTD and heater filaments are shown in the simplified circuit of FIG. 23, it is to be understood that these diagrammatically represent the RTD and heater filaments of any of the distributed RTDs shown in FIGS. 1–22 and described in detail hereinabove.

The heated distributed RTD is generally designated 300, and includes RTD filament 302 and heater filament 304 which is thermally coupled to RTD filament 302. The unheated distributed RTD is generally designated 306, and includes RTD filament 308. The heater filament of unheated distributed RTD 306 is not shown in the diagram since it is not electrically connected to the heater power source, but it is to be understood that there is preferably a heater filament in unheated distributed RTD 306 so that distributed RTD 306 is, for reference purposes, an exact counterpart of heated distributed RTD 300. Heater filament 304 of heated distributed RTD 300 is electrically energized through a conductor 309 by an electrical power source generally designated 310 which may be either a constant current source or a constant voltage source.

Preferably a pair 312 and 314 of balanced precision constant current sources, which have a power source 316, is electrically connected through respective conductors 318 and 320 to one side of respective RTD filaments 302 and 308, the other side being connected to ground. The outputs of respective RTD filaments 302 and 308 are electrically connected to the respective inputs of instrumentation amplifier 322, which is a differential operational amplifier, such connections being made through low resistance conductors 324 and 326 which lead from respective conductors 318 and 320 to amplifier 322. The output of instrumentation amplifier 322 is connected to the input of a signal processor 328, which may be any conventional microprocessor with adequate capacity, and the output of signal processor 328 is in turn connected to output circuits 330 and 332 which drive suitable instrumentation.

FIGS. 24 and 25 illustrate tank 212 and pair 208 and 210 of distributed RTDs shown in FIG. 16 and described in detail in connection therewith, but with distributed RTDs 208 and 210 disposed within a still well or stilling well 334 to mitigate the effects of fluid turbulence within tank 212. The primary problem relative to fluid turbulence relates to readout inaccuracies which may occur because of turbulence in the liquid phase, but turbulence in the gas or air phase above the liquid may also adversely affect the readout, although normally to a lesser extent. Still well 334 serves to completely shield the two distributed RTDs 208 and 210 from all such turbulence, and also serves to support distributed RTDs 208 and 210 along their vertical lengths.

Distributed RTDs 208 and 210 are normally calibrated in a still tank. The problem arises because distributed RTDs of the invention are sensitive not only to the presence of liquid, which disperses heat from the heated one of the distributed RTDs at a much greater rate than the air or gas disperses heat from the heated distributed RTD, but they are also sensitive to fluid flow, which causes heat to be dispersed from the heated distributed RTD at an even greater rate than does still liquid. Thus, with distributed RTDs 208 and 210 calibrated in a still tank, and then if the liquid should be circulating in the tank so as to cool the heated distributed RTD 208 or 210 more than when it was calibrated, the readout would indicate a higher level of liquid than is actually in the tank, the circulation cooling augumenting the natural cooling caused by the presence of the liquid. A typical example of turbulence which could cause such a false readout would be swirling caused by filling or emptying the tank.

Still well 334 is supported vertically along a wall 214 of tank 212 by means of a series of vertically spaced brackets 336. The lower and upper ends 338 and 340, respectively, of still well 334 are open, being spaced from respective bottom and top walls 216 and 218 of tank 212, so as to permit free vertical movement of liquid and air in still well 334 so that the liquid level is still well 334 will follow the liquid level in the rest of the tank, while nevertheless completely shielding the liquid and air which are in contact with distributed RTDs 208 and 210 from the effects of turbulence.

The two distributed RTDs 208 and 210 are periodically supported along the length of still well 334 by a series of regularly vertically spaced support units generally designated 342, each of which consists of a first pair of diametrically opposed support plates 344 and a second pair of diametrically opposed support plates 346 at right angles to plates 344. One of the support units is shown in FIG. 25. Each of the support plates 344 carries a pair of spaced support fingers 348, while each of the support plates 346 carries a single support finger 350. This arrangement provides three-fingered support for each of the distributed RTDs 208 and 210, with the fingers spaced substantially 120° apart about each distributed RTD 208 and 210. It will be seen that support fingers 348 and 350 make essentially point contact with distributed RTDs 208 and 210, such minimal contact area minimizing heat transfer away from distributed RTDs 208 and 210 which might otherwise disturb the accuracy of the readout. The side edges of support plates 344 and 346 are preferably bowed inwardly as illustrated to maximize fluid flow area through the support unit 342.

Support plates 344 and 346 of each support unit 342 are preferably made of stainless steel but it is to be understood that they may be made of any suitable material.

While it is most convenient to support both of the distributed RTDs 208 and 210 inside still well 334, it is to be understood that still well 334 will accomplish its aforesaid function if only the heated one of the two distributed RTDs 208 or 210 is within still well 334.

FIGS. 26 and 27 illustrate duct elbow 234 of FIGS. 17 and 18 with its pair 230 and 232 of distributed RTDs disposed in a shroud generally designated 352 which is provided to increase the usable range or rangeability of distributed RTDs 230 and 232. If the mass flow rate of the fluid flowing through duct 234 is so high that further increases in the mass flow rate will not cause substantial further cooling of heated distributed RTD 230 or 232, then the signal output becomes saturated, which defines an upper flow sensing limit for the distributed RTDs.

Shroud 352 is provided with preferably round holes uniformly distributed along its length and about its periphery so that only a fraction of the full mass flow rate through duct 234 passes through the wall of shroud 352 and thereby flows past distributed RTDs 230 and 232. These holes or performations are designated 354, and are sized to keep the mass flow rate which is applied to distributed RTDs 230 and 232 well within their sensing range despite the fact that the general fluid flow through duct 234 might be outside the range.

As an extreme example of this mass flow rate range sensitivity, if water were passed through duct or conduit 234 without shroud 352, the signal output of distributed RTDs 230 and 232 might become saturated by a flow rate as low as only about one foot per second. By applying shroud 352 around distributed RTDs 230 and 232, the sensing range could be brought up to ten feet per second or more as desired by shroud 352 according to how small the holes 354 are, with the same amount of cooling of heated distributed RTD 230 or 232 as would have been caused by the one foot per second flow rate without shroud 352.

Distributed RTDs 230 and 232 are preferably supported along the length of shroud 352 by a regularly spaced series of the support units 342 as seen in FIG. 27, such support units 342 having been described in detail hereinabove in connection with FIG. 25. Shroud 352 preferably enshrouds the entire lengths of distributed RTDs 230 and 232 which extend across duct 234.

While it is most convenient to support both of the distributed RTDs 230 and 232 inside shroud 352, it is to be understood that shroud 352 will accomplish its aforesaid function if only the heated one of the two distributed RTDs 230 or 232 is within shroud 352.

Figure 28:
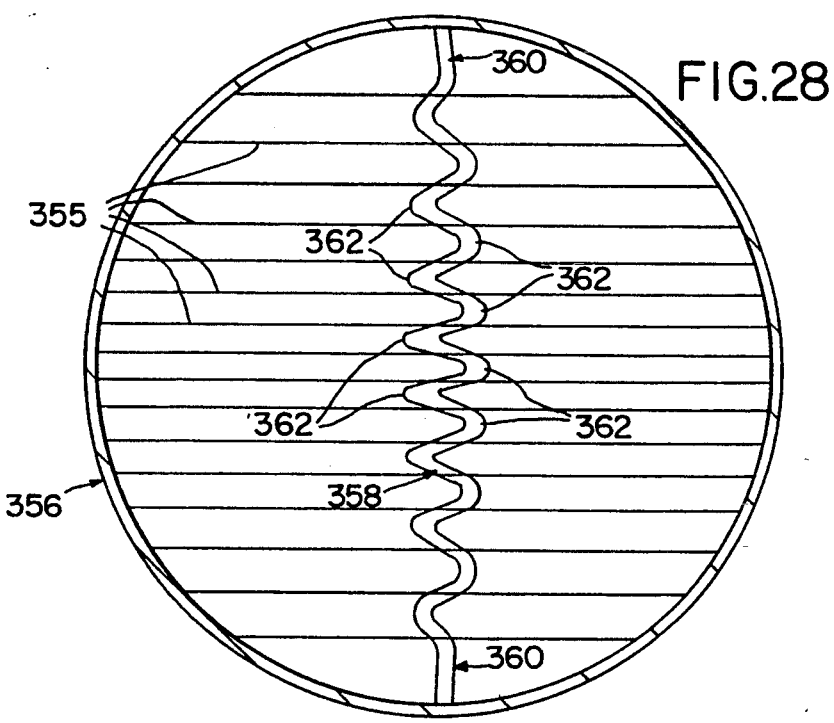
FIG. 28 is a diagrammatic cross-sectional view of a duct illustrating linear RTD means of the invention diametrically deployed across the duct and variably sinuously configured to provide a variable function response corresponding to the variable diametrical area function of fluid flow symmetrical about its diametrical axis.

The flow of fluid through duct elbow 234 of FIGS. 17, 18 and 26 is generally symmetrical about the diametrical axis along which distributed RTDs 230 and 232 are deployed. However, if straight, linear distributed RTDs are employed, as the distributed RTDs 230 and 232 are shown in FIG. 18, they would not provide a signal output that would be truly representative of the average mass flow rate, because the cross-sectional area of round duct 234 varies nonlinearly along the vertical axis of deployment shown in FIGS. 18 and 26, smaller cross-sectional areas for the same incremental lengths of the distributed RTDs being present near the upper and lower ends of the distributed RTDs than near the centers of the distributed RTDs. FIG. 28 illustrates a sinuous or serpentine configuration of distributed RTDs which may be employed to compensate for this, providing equal incremental lengths of distributed RTDs for equal cross-sectional areas of flow sensed by these incremental lengths. To illustrate how this works, a series of horizontal lines 355 has been drawn across duct 356 shown in FIG. 28 which divides the duct into substantially equal cross-sectional areas along the vertical axis of symmetry. The matched pair of distributed RTDs which extends generally along the vertical axis of symmetry is designated 358, and includes the usual heated distributed RTD and unheated reference distributed RTD. The distributed RTD pair 358 commences in generally straight end portions 360 proximate the upper and lower ends of the vertical axis of duct 356, and then curves horizontally back and forth sinuously in loops 362 which swing wider and wider but in vertically tighter, closer together loops toward the center of the vertical axis so that the same incremental length of distributed RTDs 358 is disposed in each of the equal areas defined between the horizontal lines.

Figure 29:
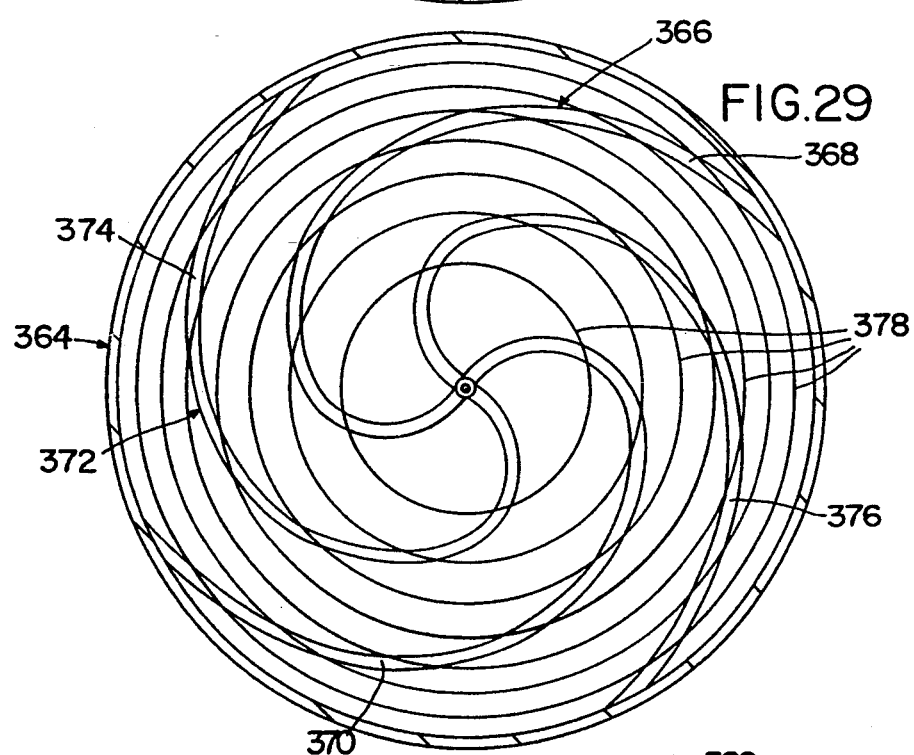
FIG. 29 is a diagrammatic cross-sectional view of a duct illustrating linear RTD means of the invention arrayed in a spiral configuration to provide a variable function response corresponding to the variable radial area function of fluid flow symmetrical about the center axis of the duct.

With this varying sinuous or serpentine configuration of linear distributed RTDs 358, equal incremental lengths of linear distributed RTDs 358 will sense equal incremental areas across duct 356, to provide a signal output truly representative of average mass flow rate where the flow is generally symmetrical about the axis of deployment of distributed RTDs 358. Thus, distributed RTDs 358 are configured so as to respond as a variable function that is proportional to duct area along their lengths.

Where the flow of fluid is symmetrical about the center axis of a duct rather than a diametrical axis, a spiral configuration of linear distributed RTDs of the invention may be employed as illustrated in FIG. 29 to correlate equal incremental lengths of the distributed RTDs with equal incremental circular areas through which the incremental RTD lengths pass about the center axis of the duct, whereby the spiral configuration compensates for the fact that area increases in proportion to the square of the radius from the center axis. Thus, the spiral configuration provides a variable function to the linear distributed RTDs which corresponds to the variable square function of duct area relative to radius.

Referring to FIG. 29, a first matched pair of distributed RTDs of the invention, one of which is heated and the other of which is unheated to serve as a reference, is generally designated 366, and is arranged as a pair of opposite spiral arms 368 and 370 disposed symmetrically about the center axis of duct 364 and oriented generally along the vertical diametrical axis as the duct is illustrated. Similarly, another parallel, matched pair of distributed RTDs of the invention, generally designated 372 and including a heated distributed RTD and an unheated reference RTD, is arranged as a pair of opposite spiral arms 374 and 376 symmetrically about the center axis of duct 364 and oriented generally along the horizontal diametrical axis as the duct is illustrated. With this arrangement, four separate sensing spiral arms are provided 90° apart, each of which has incremental lengths of the same length which pass through respective circular incremental areas of equal area. Circular lines 378 drawn about the center axis of duct 364 define equal areas between them, including the central disk area enclosed within the innermost circle 378, and it will be seen substantially equal incremental lengths of distributed RTDs 366 are disposed between successive circular lines 378.

The array of four uniformly separated spiral arms 90° apart provides an excellent overlapping matrix of spiral arms to sense the mass flow rate in all sectors over the area of duct 364, to provide an excellent average readout of the mass flow rate despite the fact that there may be considerable variations in the flow rate for different regions in the overall cross-sectional area of duct 364. If even greater averaging is desired, additional spirals may be provided, as for example eight spiral arms provided by four matched pairs of linear distributed RTDs, the eight spiral arms being 45° apart. Alternatively, if the flow is relatively uniform over the cross-sectional area of duct 364, then two spiral arms 180° apart such as the two spiral arms 368 and 370 of linear distributed RTDs 366 will suffice. Typically, the flow in a duct may be symmetrical about one axis, as for example the vertical axis in FIG. 29, in which case the generally averaged distribution of spiral arms 368 and 370 about the vertical axis will give a good average readout. As a further alternative, if desired, the linear RTDs may be arranged in but a single spiral arm such as spiral arm 368.

The distributed RTDs of the invention have the characteristic of relatively higher sensitivity to relatively lower flow rates. For example, the distributed RTDs of FIG. 29 would have a higher sensitivity within a range of flow rates from zero to five feet per second than within a range of flow rates from 20 to 25 feet per second. If the highest possible sensitivity to flow rate change is desired, and the empircal mass flow rate is not as important, then it is desirable to favor distribution of the distributed RTD material in the zone of lower flow rate where there are differing flow rates in a duct. Looking at FIG. 29 for example, the flow rate radially outwardly near the wall of duct 364 will be less than the flow rate radially inwardly near the center of the duct. Thus, to take advantage of this greater sensitivity achievable at slower flow rates, spiral arms 368, 370, 374 and 376 would be curved to be more tangentially related to the wall of duct 364 so as to place a larger amount of RTD material in this zone of slower fluid flow. Similarly, matrices of distributed RTDs of the invention other than the spiral matrix shown in FIG. 29 may be arranged to have a proportionately greater amount of RTD material in zones of lesser flow rates wherever they may be over the area of the duct to take advantage of the increased sensitivity obtainable from the lesser flow rates.

If, on the other hand, mass flow rate averaging were more important than such added sensitivity, then to compensate for the lesser flow rate proximate the wall of duct 364, the spiral arms may be bent more radially outwardly proximate their outer ends to provide less RTD material, and hence less sensitivity, in such region of lesser flow rate. In this case, the ends of the spiral arms would be less tangential to the wall of duct 364. Similarly, matrices of distributed RTDs of the invention other than the spiral matrix shown in FIG. 29 may be arranged to have proportionately lesser RTD material in zones of lesser flow rates wherever they may be over the area of the duct.

Figure 30:
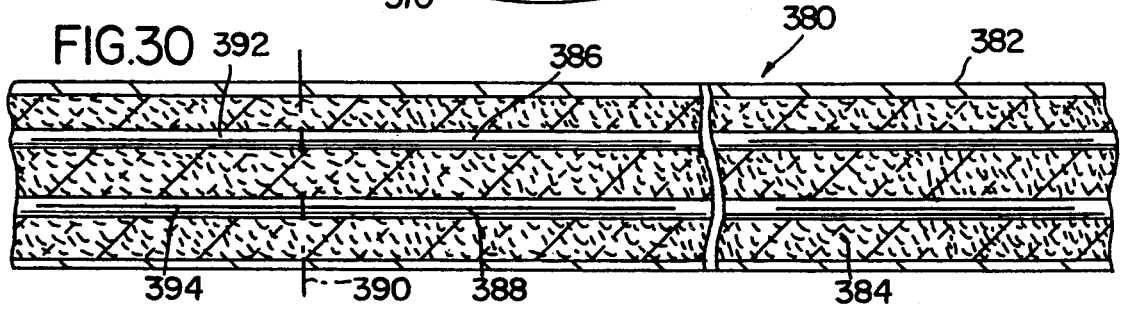
FIG. 30 is a greatly enlarged fragmentary axial sectional view, with portions in elevation and portions broken away, of a form of the invention wherein a continuous outer sheath encloses and protects both the distributed RTD and heater filaments of the invention and the electrical conductors connecting such filaments to detection circuitry.

FIG. 30 illustrates a form of distributed RTD of the invention which employs a continuous outer sheath that houses not only the RTD and heater filaments of the sensing portion of the invention, but also houses the electrical conductors which electrically connect the RTD and heater filaments of the sensor to remote detection circuitry so that remote readout can be obtained with no interruption of the sheath, and without need for any electrical connectors, junction boxes or the like. This form of the invention has particular utility in atomic power plants where it is undesirable to have electrical junctions inside the reactor vessel or inside the containment vessel, junctions being by far the most likely points of failure, and being difficult to access in some regions of the power plant. The continuous sheath RTD and conductor device of FIG. 30 positively precludes any such failure.

Referring to FIG. 30, the distributed RTD/conductor device is generally designated 380, and for convenience is disclosed in a simplified form having a single RTD filament and a single heater filament. The primary structural basis is outer sheath 382, preferably of metal such as stainless steel. Extending coextensively with the length of outer sheath 382 is insulation body 384, preferably of mineral insulation material. Parallel RTD and heater filaments 386 and 388, respectively, extend the length of the sensor portion of distributed RTD/conductor sheath 382 and insulation body 384, which ends at the transverse phantom line 390. At 390, the ends of filaments 386 and 388 are connected, preferably by welding, to ends of respective electrical conductors 392 and 394 made of highly conductive material such as copper. Sheath 382 and insulation body 384 continue uninterruptedly from the sensor to carry the electrical conductors 392 and 394 to the instrumentation where the readout is developed, no matter how remote such instrumentation may be, thus avoiding any electrical connectors, junction boxes, or the like at any location in the plant except where the instrumentation is located and monitored. Thus, sheath 382 and insulation body 384 may be considered as having distributed RTD portions which house the filaments 386 and 388, and conductor portions which house the conductors 392 and 394, with the conductor portions being continuous extensions of the distributed RTD portions.

Distributed RTD/conductor device 380 is manufactured in the same manner as the other forms of the invention, starting with a relatively short and thick billet-like assembly which is swaged and/or drawn out to the finished long, thin device.

While the present invention has been described with regard to particular embodiments, modifications may readily be made by those skilled in the art, and it is intended that the claims cover any such modifications which fall within the scope and spirit of the invention as set forth in the appended claims.

I claim:

1. A method of measuring average mass flow velocity of gas in a duct where the gas has a nonuniform flow velocity distribution across the duct, the method comprising the steps of:

deploying at least one elongated, relatively stiff, wirelike distributed RTD sensing means across said duct from one side to the other, the RTD sensing means having heater means co-extensive in length with the RTD sensing means;

thermally sensing by the RTD sensing means physical information about the mass flow rate of the gas external to the RTD sensing means and developing signal outputs of the RTD sensing means representative of said information;

transmitting the signal outputs to a remote location; and detecting and interpreting the signals at the remote location to obtain the desired information about the mass flow velocity of fluid through said duct from the RTD signal outputs;

said distributed RTD means being deployed generally radially across said duct in a nonlinear configuration which places substantially equal lengths of said distributed RTD sensing means across substantially equal cross-sectional flow areas of said duct so that said signal output will substantially linearly represent average mass flow rate of fluid through said duct, said distributed RTD sensing means being arranged in a spiral configuration having a plurality of regularly angularly spaced spiral arms.

2. The method recited in claim 1, and comprising the further step of arranging said distributed RTD sensing means in a spiral configuration having at least four spiral arms.

3. A method of measuring average mass flow velocity of gas in a duct where the gas has a nonuniform flow velocity distribution across the duct, the method comprising the steps of:

deploying at least one elongated, relatively stiff, wirelike distributed RTD sensing means across said duct from one side to the other, the RTD sensing means having heater means co-extensive in length with the RTD sensing means;

thermally sensing by the RTD sensing means physical information about the mass flow rate of the gas external to the RTD sensing means and developing signal outputs of the RTD sensing means representative of said information;

transmitting the signal outputs to a remote location; and detecting and interpreting the signals at the remote location to obtain the desired information about the mass flow velocity of fluid through said duct from the RTD signal outputs;

said distributed RTD sensing means being deployed generally diametrically across said duct in a nonlinear configuration which places substantially equal lengths of said distributed RTD sensing means across substantially equal cross-sectional flow areas of said duct so that said signal output will substantially linearly represent average mass flow rate of fluid through said duct, said distributed RTD sensing means being arranged in a variable sinuous configuration.

* * * * *